US012509429B2

(12) United States Patent
Eeda et al.

(10) Patent No.: US 12,509,429 B2
(45) Date of Patent: Dec. 30, 2025

(54) HYDROXYBENZAMIDE DERIVATIVES AND METHODS OF USE IN TREATING DIABETES

(71) Applicant: THE BOARD OF REGENTS OF THE UNIVERSITY OF OKLAHOMA, Norman, OK (US)

(72) Inventors: Venkateswararao Eeda, Oklahoma City, OK (US); Weidong Wang, Edmond, OK (US)

(73) Assignee: THE BOARD OF REGENTS OF THE UNIVERSITY OF OKLAHOMA, Norman, OK (US)

( * ) Notice: Subject to any disclaimer, the term of this patent is extended or adjusted under 35 U.S.C. 154(b) by 424 days.

(21) Appl. No.: 18/309,065

(22) Filed: Apr. 28, 2023

(65) Prior Publication Data

US 2023/0348396 A1 Nov. 2, 2023

Related U.S. Application Data

(60) Provisional application No. 63/341,703, filed on May 13, 2022, provisional application No. 63/336,355, filed on Apr. 29, 2022.

(51) Int. Cl.
*C07C 235/34* (2006.01)
*A61P 1/18* (2006.01)
*C07C 235/46* (2006.01)
*C07C 275/34* (2006.01)
*C07D 233/64* (2006.01)
*C07D 233/88* (2006.01)

(52) U.S. Cl.
CPC .............. *C07D 233/88* (2013.01); *A61P 1/18* (2018.01); *C07C 235/34* (2013.01); *C07C 235/46* (2013.01); *C07C 275/34* (2013.01); *C07D 233/64* (2013.01)

(58) Field of Classification Search
CPC .................................................... C07C 235/34
See application file for complete search history.

(56) References Cited

PUBLICATIONS

Ding, et al. Bioorganic & Medicinal Chemistry (2021), 41, 116216 (abstract); retrieved from STN.*
Fomovska, et al. Antimicrobial Agents and Chemotherapy (2012), 56(5), 2666-2682 (abstract); retrieved from STN.*
Ray, S. International Journal of PharmTech Research (2012), 4(1), 99-105 (abstract); retrieved from STN.*
Back, S. H. et al., "Endoplasmic reticulum stress and type 2 diabetes," *Annual review of biochemistry*, 2012, 81, 767-793.
Bertolotti, A. et al., "Dynamic interaction of BiP and ER stress transducers in the unfolded-protein response," *Nature Cell Biology*, 2000, 2 (6), 326-332.

Bukau, B. et al., "Molecular chaperones and protein quality control," *Cell*, 2006, 125 (3), 443-451.
Cunningham, A. L. et al., "Efficacy of the Herpes Zoster Subunit Vaccine in Adults 70 Years of Age or Older," *The New Englad Journal of Medicine*, 2016, 375, 1019-1032.
Dill, K. A. et al., "The protein folding problem," *Annu Rev Biophys*, 2008, 37, 289-316.
Donath, M. Y. et al., "Decreased beta-cell mass in diabetes: significance, mechanisms and therapeutic implications," *Diabetologia*, 2004, 47 (3), 581-589.
Duan, H. et al., "Identification of 1,2,3-triazole derivatives that protect pancreatic β cells. Against endoplasmic reticulum stress-mediated dysfunction and death through the inhibition of C/EBP-homologous protein expression," *Bioorganic & medicinal chemistry*, 2016, 24 (12), 2621-2630.
Eeda, V. et al., "Discovery of N-(2-(Benzylamino)-2-oxoethyl)benzamide analogs as a novel scaffold of pancreatic β-cell protective agents against endoplasmic reticulum stress," *Chem Biol Drug Des*, 2020, 95 (3), 388-393.
Eizirik, D. L. et al., "The role for endoplasmic reticulum stress in diabetes mellitus," *Endocrine reviews*, 2008, 29 (1), 42-61.
Ermolat'ev, D. S. et al., "A Divergent Synthesis of Substituted 2-Aminoimidazoles from 2- Aminopyrimidines," *The Journal of Organic Chemistry*, 2008, 73 (17), 6691-6697.
Fonseca, S. G. et al., "Endoplasmic reticulum stress and pancreatic β-cell death," *Trends Endocrinol Metab*, 2011, 22 (7), 266-274.
Ghosh, R. et al., "Endoplasmic reticulum stress, degeneration of pancreatic islet b-cells, and therapeutic modulation of the unfolded protein response in diabetes," *Molecular Metabolism*, 2019, 27, S60-S68.
Haze, K. et al., "Mammalian transcription factor ATF6 is synthesized as a transmembrane protein and activated by proteolysis in response to endoplasmic reticulum stress," *Mol Biol Cell*, 1999, 10 (11), 3787-3799.
Herceg, Z. et al., "Functions of poly(ADP-ribose) polymerase (PARP) in DNA repair, genomic integrity and cell death," *Mutat Res*, 2001, 477 (1-2), 97-110.
Herlea-Pana, O. et al., "Pharmacological Inhibition of Inositol-Requiring Enzyme 1α RNase Activity Protects Pancreatic Beta Cell and Improves Diabetic Condition in Insulin Mutation-Induced Diabetes," *Frontiers in Endocrinology*, 2021, 12 (1281), 1-14.
Hetz, C. et al., "Targeting the unfolded protein response in disease," *Nature reviews. Drug discovery*, 2013, 12 (9), 703-719.
Kahn, S. E., "The relative contributions of insulin resistance and beta-cell dysfunction to the pathophysiology of Type 2 diabetes," *Diabetologia*, 2003, 46 (1), 3-19.
Kaufman, R. J., "Orchestrating the unfolded protein response in health and disease," *J Clin Invest*, 2002, 110 (10), 1389-1398.

(Continued)

*Primary Examiner* — Shawquia Jackson
(74) *Attorney, Agent, or Firm* — pH IP Law

(57) ABSTRACT

Hydroxybenzamide derivative compounds having β-cell protective activity against ER stress, and methods of their use in treating diabetes and other conditions and diseases associated with ER stress. In one non-limiting embodiment, the derivative is 3-hydroxy-N-(4-(trifluoromethyl)benzyl) benzamide.

4 Claims, 6 Drawing Sheets
Specification includes a Sequence Listing.

(56) References Cited

PUBLICATIONS

Kim, C-H. et al., "Short Report: Pathophysiology Relative contributions of insulin resistance and b-cell dysfunction to the development of Type 2 diabetes in Koreans," *Diabetic Medicine*, 2013, 30, 1075-1079.

Liu, M. et al., "Biosynthesis, structure, and folding of the insulin precursor protein," *Diabetes Obes Metab*, 2018, 20 Suppl 2 (Suppl 2), 28-50.

Ma, Y. et al., "Two distinct stress signaling pathways converge upon the CHOP promoter during the mammalian unfolded protein response," *J Mol Biol*, 2002, 318 (5), 1351-1365.

Marciniak, S. J. et al., "CHOP induces death by promoting protein synthesis and oxidation in the stressed endoplasmic reticulum," *Genes & Development*, 2004, 18 (24), 3066-3077.

Mori, K., "Signalling pathways in the unfolded protein response: development from yeast to mammals," *J Biochem*, 2009, 146 (6), 743-750.

Muoio, D. M. et al., "Mechanisms of disease:Molecular and metabolic mechanisms of insulin resistance and beta-cell failure in type 2 diabetes," *Nat. Rev. Mol. Cell Biol.*, 2008, 9 (3), 193-205.

Papa, F. R., "Endoplasmic reticulum stress, pancreatic beta-cell degeneration, and diabetes," *Cold Spring Harbor perspectives in medicine*, 2012, 2 (9), a007666, 1-17.

Persaud, S. J.; Jones, P. M., A Wake-up Call for Type 2 Diabetes? *N Engl J Med* 2016, 375 (11), 1090-1092.

Prentki, M. et al., "Islet β cell failure in type 2 diabetes," *The Journal of clinical investigation*, 2006, 116 (7), 1802-1812.

Ron, D. et al., "Signal integration in the endoplasmic reticulum unfolded protein response," *Nat Rev Mol Cell Biol*, 2007, 8 (7), 519-529.

Saeedi, P. et al., "Global and regional diabetes prevalence estimates for 2019 and projections for 2030 and 2045: Results from the International Diabetes Federation Diabetes Atlas, $9^{th}$ edition," *Diabetes Res Clin Pract*, 2019, 157, 107843, 1-10.

Sidrauski, C. et al., "The unfolded protein response: an intracellular signalling pathway with many surprising features," *Trends Cell Biol*, 1998, 8 (6), 245-249.

Slee, E. A. et al., "Ordering the cytochrome c-initiated caspase cascade: hierarchical activation of caspases-2, -3, -6, -7, -8, and -10 in a caspase-9-dependent manner," *J Cell Biol*, 1999, 144 (2), 281-292.

Tabas, I. et al., "Integrating the mechanisms of apoptosis induced by endoplasmic reticulum stress," *Nat. Cell Biol.*, 2011, 13 (3), 184-190.

Tran, K. et al., "Identification of small molecules that protect pancreatic beta cells against endoplasmic reticulum stress-induced cell death," *ACS chemical biology*, 2014, 9 (12), 2796-2806.

Walter, P. et al., "The Unfolded Protein Response: From Stress Pathway to Homeostatic Regulation," *Science*, 2011, 334 (6059), 1081-1086.

Wang, S. et al., "The impact of the unfolded protein response on human disease," *The Journal of cell biology*, 2012, 197 (7), 857-867.

Yong, J. et al., "Therapeutic opportunities for pancreatic β-cell ER stress in diabetes mellitus," *Nature reviews. Endocrinology*, 2021, 17 (8), 455-467.

Zinszner, H. et al., "CHOP is implicated in programmed cell death in response to impaired function of the endoplasmic reticulum," *Genes & Development* 1998, 12 (7), 982-995.

\* cited by examiner

DMSO

Tm

Tm+WO3i

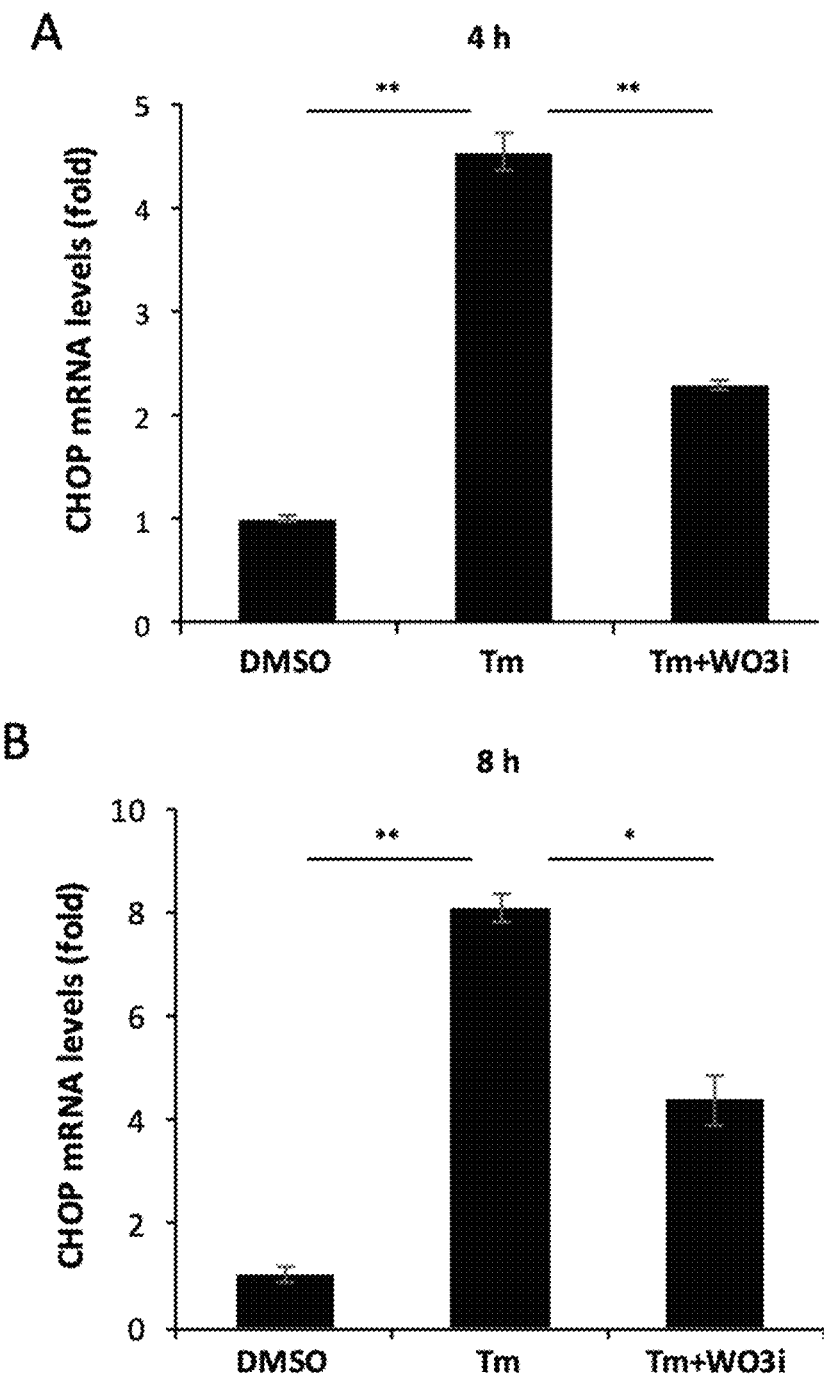
FIGS. 3A-B

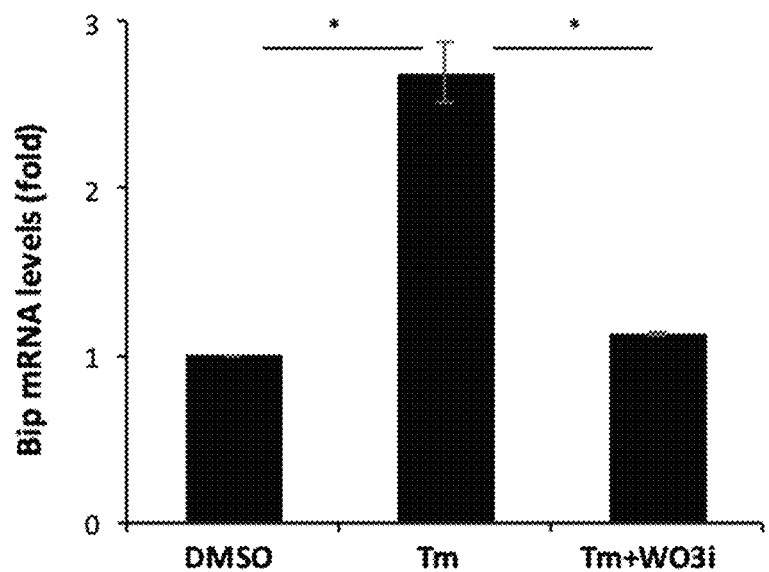
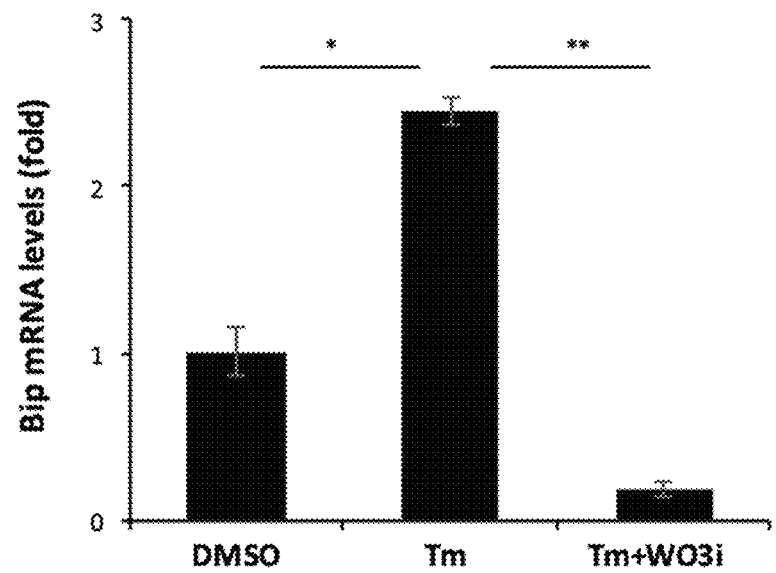
FIGS. 4A-B

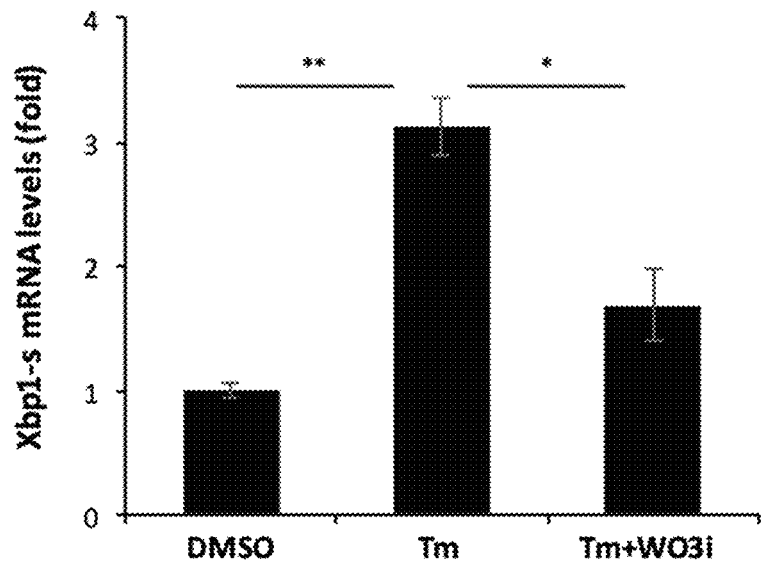
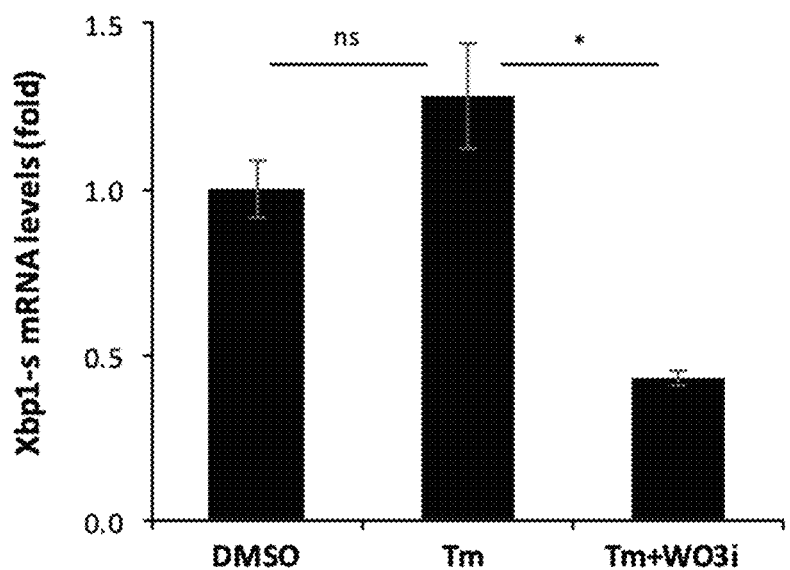
FIGS. 5A-B

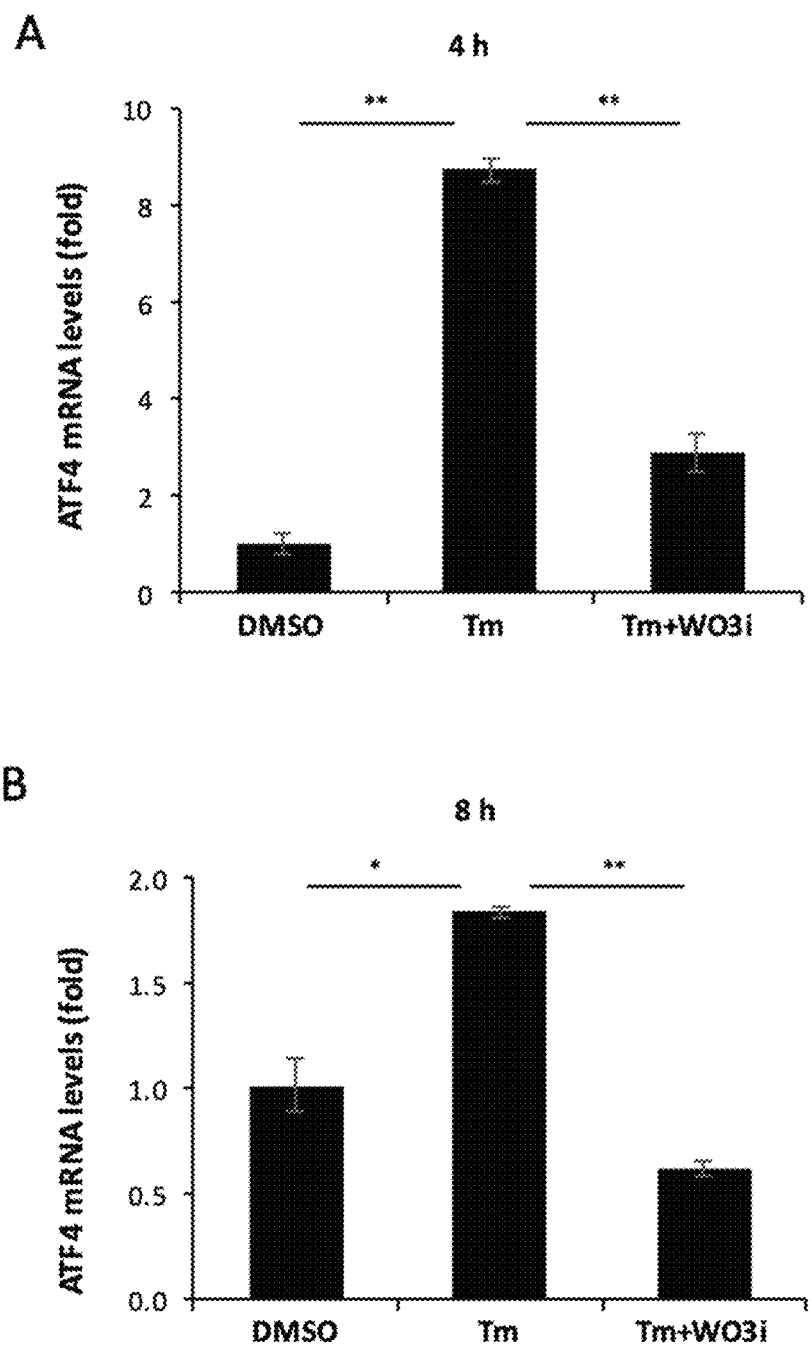
FIGS. 6A-B

SEQUENCE LISTING

```
Sequence total quantity: 10
SEQ ID NO: 1            moltype = DNA  length = 20
FEATURE                 Location/Qualifiers
source                  1..20
                        mol_type = other DNA
                        organism = synthetic construct
SEQUENCE: 1
gaaatcgagc gcctgaccag                                                   20

SEQ ID NO: 2            moltype = DNA  length = 21
FEATURE                 Location/Qualifiers
source                  1..21
                        mol_type = other DNA
                        organism = synthetic construct
SEQUENCE: 2
ggaggtgatg ccaacagttc a                                                 21

SEQ ID NO: 3            moltype = DNA  length = 20
FEATURE                 Location/Qualifiers
source                  1..20
                        mol_type = other DNA
                        organism = synthetic construct
SEQUENCE: 3
tcctgaacag cgaagtgttg                                                   20

SEQ ID NO: 4            moltype = DNA  length = 20
FEATURE                 Location/Qualifiers
source                  1..20
                        mol_type = other DNA
                        organism = synthetic construct
SEQUENCE: 4
gtgtctgagg cactgaccaa                                                   20

SEQ ID NO: 5            moltype = DNA  length = 21
FEATURE                 Location/Qualifiers
source                  1..21
                        mol_type = other DNA
                        organism = synthetic construct
SEQUENCE: 5
ctattcctgc gtcggtgtat t                                                 21

SEQ ID NO: 6            moltype = DNA  length = 21
FEATURE                 Location/Qualifiers
source                  1..21
                        mol_type = other DNA
                        organism = synthetic construct
SEQUENCE: 6
ggttggacgt gagttggttc t                                                 21

SEQ ID NO: 7            moltype = DNA  length = 21
```

```
                        -continued

FEATURE                 Location/Qualifiers
source                  1..21
                        mol_type = other DNA
                        organism = synthetic construct
SEQUENCE: 7
ctgagtccga atcaggtgca g                                              21

SEQ ID NO: 8            moltype = DNA  length = 21
FEATURE                 Location/Qualifiers
source                  1..21
                        mol_type = other DNA
                        organism = synthetic construct
SEQUENCE: 8
atccatggga agatgttctg g                                              21

SEQ ID NO: 9            moltype = DNA  length = 20
FEATURE                 Location/Qualifiers
source                  1..20
                        mol_type = other DNA
                        organism = synthetic construct
SEQUENCE: 9
ggtgacttca cacgccataa                                                20

SEQ ID NO: 10           moltype = DNA  length = 20
FEATURE                 Location/Qualifiers
source                  1..20
                        mol_type = other DNA
                        organism = synthetic construct
SEQUENCE: 10
cttcccaaag accacatgct                                                20
```

HYDROXYBENZAMIDE DERIVATIVES AND METHODS OF USE IN TREATING DIABETES

REFERENCE TO RELATED APPLICATIONS

The present application claims the priority benefit of U.S. provisional application No. 63/336,355, filed Apr. 29, 2022, and U.S. provisional application No. 63/341,703, filed May 13, 2022, the entire contents of each of which are incorporated herein by reference.

STATEMENT REGARDING FEDERALLY SPONSORED RESEARCH OR DEVELOPMENT

This invention was made with government support under grant numbers R01DK116017 and R01DK128848 awarded by the National Institutes of Health. The government has certain rights in the invention.

REFERENCE TO A SEQUENCE LISTING

This application contains a Sequence Listing XML, which has been submitted electronically and is hereby incorporated by reference in its entirety. Said Sequence Listing XML, created on Apr. 3, 2023, is named OKLAP0010US_ST26.xml and is 9,856 bytes in size.

BACKGROUND

Diabetes mellitus is a chronic disease of hyperglycemia and a leading cause of death and is estimated to affect over 463 million people worldwide. Insulin is a hormone produced and secreted by pancreatic β cells that controls blood glucose. Hyperglycemia occurs when β cells do not produce enough insulin (type 1 diabetes (T1D)) or when the body cannot effectively use the insulin (type 2 diabetes (T2D)) and leads to damage in major essential organs, with serious consequences including kidney failure, heart attacks, stroke, blindness, and lower limb amputation.

Loss of functional β cells is a critical event in the pathogenesis of both T1D and T2D. Endoplasmic reticulum (ER) stress is known to be a major cause of β cell loss. The ER has key roles in protein, lipid, and glucose metabolism as well as cellular signaling and homeostasis. Within the ER, the process of protein synthesis and secretion is highly and dynamically controlled at multiple levels to meet intrinsic needs as well as external demands. Upon translation, secretory, luminal and membrane proteins are translocated into the lumen of the ER for covalent modification and proper folding. A balance between the ER capacities on protein loading and folding must be established to maintain the proper function of the ER. When this balance is disrupted, unfolded proteins accumulate in the ER, a condition called ER stress, which in turn triggers the evolutionarily conserved signaling cascade called the unfolded protein response (UPR).

The UPR process is mediated by three ER transmembrane-sensory proteins: PKR (RNA-activated protein kinase)-like endoplasmic reticulum kinase (PERK), activating transcription factor 6 (ATF6), and inositol-requiring protein 1α (IRE1α). Upon ER stress, these sensory proteins are activated to elicit intercellular signaling pathways. As an initial adaptive response, these sensors trigger a series of events to cope with this stress and re-establish homeostasis by altering the translation, folding, and post-translational modification of secreted and membrane proteins. Under chronic or severe ER stress, however, the UPR becomes maladaptive and irreversible, a situation termed terminal UPR activation, resulting in the activation of ER stress-specific pro-apoptotic genes such as the transcription factor C/EBP-homologous protein (CHOP) and of apoptotic genes, eventually leading to cell death.

Certain 1,2,3-triazole derivatives have been previously identified as β cell protective compounds having use in treating diabetes. However, the compounds showed a narrow range of potency. The present work is directed to novel compounds which are more in effective protecting β cell function than such previously known drugs and therefore are more effective as treatments for diabetes.

BRIEF DESCRIPTION OF THE DRAWINGS

FIGS. 3A-B show that WO3i suppresses Tm-induced CHOP mRNA expression in INS-1 cells. CHOP mRNA levels by qRT-PCR in INS-1 cells treated for 4 h (A) and 8 h (B) with WO3i at 5 µM in the presence or absence of Tm (0.5 µg/ml). Data are presented as the fold change after normalized to cyclophilin A mRNA.

FIGS. 4A-B show that WO3i suppresses Tm-induced ATF6 activation in INS-1 cells. BiP mRNA levels by qRT-PCR in INS-1 cells treated for 4 h (A) and 8 h (B) with WO3i at 5 µM in the presence or absence of Tm (0.5 µg/ml). Data are presented as the fold change after normalized to cyclophilin A mRNA.

FIGS. 5A-B show that WO3i suppresses Tm-induced IRE1α activation in INS-1 cells. Spliced Xbp1 (Xbp1-s) mRNA levels by qRT-PCR in INS-1 cells treated for 4 h (A) and 8 h (B) with WO3i at 5 µM in the presence or absence of Tm (0.5 µg/ml). Data are presented as the fold change after normalized to cyclophilin A mRNA.

FIGS. 6A-B show that WO3i suppresses Tm-induced PERK activation in INS-1 cells. ATF4 mRNA levels by qRT-PCR in INS-1 cells treated for 4 h (A) and 8 h (B) with WO3i at 5 µM in the presence or absence of Tm (0.5 µg/ml). Data are presented as the fold change after normalized to cyclophilin A mRNA.

DETAILED DESCRIPTION

Figure 1:
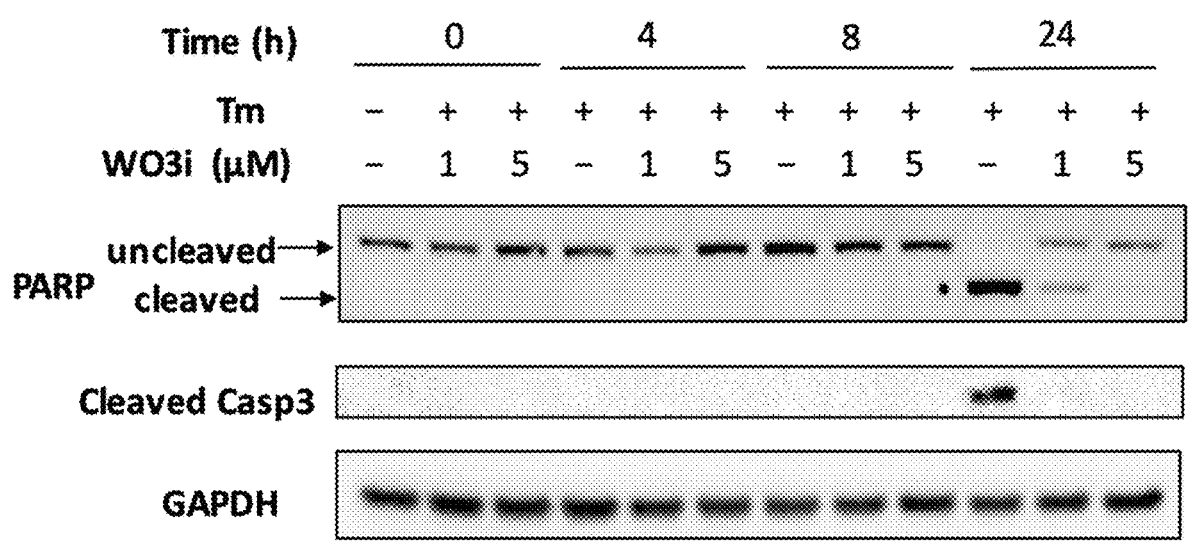
FIG. 1 shows that compound 3i (also referred to herein as "WO3i") suppresses Tunicamycin (Tm)-induced apoptosis in INS-1 β cells. INS-1 cells were treated with or without Tm (0.3 µg/ml) in the presence of WO3i at indicated concentrations or DMSO for indicated times. Cleaved caspase-3 and PARP were determined by Western blotting. GADPH was used as a loading control. The data shown are representative of 3 independent experiments.

The present disclosure is directed to novel hydroxybenzyamide derivatives and methods of their synthesis and use in protecting β-cell and treating diabetes. The compounds are effective in inhibiting ER stress and as such can be used as potent suppressors of ER stress-induced β-cell death and dysfunction. In at least one non-limiting embodiment, the derivative compound is 3-hydroxy-N-(4-(trifluoromethyl)benzyl)benzamide (WO3i) and has 100% maximal activity against ER stress at the low concentration 1.2 µM with an $EC_{50}$ 0.19 µM. Results indicate that WO3i, for example, inhibits the ER stress-induced activation of all three UPR pathways.

Before further describing various embodiments of the present disclosure in more detail by way of exemplary description, examples, and results, it is to be understood that the compounds, compositions, and methods of present disclosure are not limited in application to the details of specific embodiments and examples as set forth in the following description. The description provided herein is intended for purposes of illustration only and is not intended to be construed in a limiting sense. As such, the language used herein is intended to be given the broadest possible scope and meaning; and the embodiments and examples are meant to be exemplary, not exhaustive. Also, it is to be understood that the phraseology and terminology employed herein is for the purpose of description and should not be regarded as limiting unless otherwise indicated as so. Moreover, in the following detailed description, numerous specific details are set forth in order to provide a more thorough understanding of the present disclosure. However, it will be apparent to a person having ordinary skill in the art that the present disclosure may be practiced without these specific details. In other instances, features which are well known to persons of ordinary skill in the art have not been described in detail to avoid unnecessary complication of the description. It is intended that all alternatives, substitutions, modifications and equivalents apparent to those having ordinary skill in the art are included within the scope of the present disclosure. All of the compounds, compositions, and methods and application and uses thereof disclosed herein can be made and executed without undue experimentation in light of the present disclosure. Thus, while the compounds, compositions, and methods of the present disclosure have been described in terms of particular embodiments, it will be apparent to those of skill in the art that variations may be applied to the compounds, compositions, and methods and in the steps or in the sequence of steps of the methods described herein without departing from the concept, spirit, and scope of the inventive concepts.

All patents, published patent applications, and non-patent publications including published articles mentioned in the specification or referenced in any portion of this application, are herein expressly incorporated by reference in their entirety to the same extent as if each individual patent or publication was specifically and individually indicated to be incorporated by reference.

The following abbreviations may be used herein:
T1D, type 1 diabetes;
T2D, type 2 diabetes;
DMSO, dimethylsulfoxide;
GADPH, glyceraldehyde 3 phosphate dehydrogenase;
RNA, Ribonucleic acid;
mRNA, messenger RNA;
DNA, Deoxyribonucleic acid;
ATP, adenosine triphosphate;
Tm, tunicamycin;
ER, endoplasmic reticulum;
STAT1, signal transducer and activator of transcription 1;
INS-1 cells, rat insulinoma cell line-1;
DIEA, N,N-diisopropylethylamine;
UPR, unfolded protein response;
SAR, structure-activity relationship;
$EC_{50}$, half maximal effective concentration;
qRT-PCR, quantitative reverse transcription polymerase chain reaction;
BFA, brefeldin A;
IRE1α, inositol-requiring protein 1α;
CHOP, C/EBP homologous protein;
PARP, Poly(ADP-ribose) polymerase;
Casp3, Caspase-3;
eIF2α, eukaryotic translation initiator factor 2α;
TUNEL, Terminal deoxynucleotidyl transferase dUTP nick end labeling;
GSIS, Glucose Stimulated Insulin Secretion;
PERK, PKR (RNA-activated protein kinase)-like endoplasmic reticulum kinase;
XBP1, X-box binding protein 1;
ATF6, activating transcription factor 6;
ATF4, activating transcription factor 4;
FBS, fetal bovine serum;
PBS, phosphate-buffered saline;
PDX1, pancreatic and duodenal homeobox 1;
MafA, v-maf musculoaponeurotic fibrosarcoma oncogene family, protein A;
INS1, insulin 1;
INS2, insulin 2;
mAb, monoclonal antibody;
ALS, amyotrophic lateral sclerosis;
AD, Alzheimer's disease;
PSP, progressive supra nuclear palsy;
Halo, halogen;
Cl, chlorine;
F, fluorine;
Br, bromine;
I, iodine;
FBS, fetal bovine serum;
HEPES, (4-(2-hydroxyethyl)-1-piperazineethanesulfonic acid;
CT, cycle threshold;
F, forward;
R, reverse;
PVDF, polyvinylidene difluoride;
HRP, horseradish peroxidase;
HPLC. High pressure liquid chromatography;
DCM, dichloromethane;
DIPEA, diisopropylethylamine;
HATU, Hexafluorophosphate Azabenzotriazole Tetramethyl Uronium;
HBA, Hydroxybenzamide;
OMe, methoxy;
Ph, phenyl;
iPr, isopropyl;
XBP1, X-box binding protein-1;
BiP, Binding immunoglobulin Protein; and
WO3i, 3-hydroxy-N-(4-(trifluoromethyl)benzyl)benzamide.

The term "pharmaceutically acceptable" refers to compounds and compositions which are suitable for administration to humans and/or animals without undue adverse side effects such as toxicity, irritation and/or allergic response commensurate with a reasonable benefit/risk ratio. The compounds or conjugates of the present disclosure may be combined with one or more pharmaceutically-acceptable excipients, including carriers, vehicles, diluents, and adjuvents which may improve solubility, deliverability, dispersion, stability, and/or conformational integrity of the compounds or conjugates thereof.

The term "active agent" as used herein refers to hydroxybenzylamide derivative compounds as described herein or active conjugates thereof. A conjugate is a compound comprising an active agent covalently linked, directly or indirectly via a linker molecule, to a secondary compound, such as an antibody or fragment thereof. The active agent may be associated with a targeting moiety or molecule which is able to bind to a target cell or a portion of a target cell. The targeting moiety may be linked directly or indirectly to the active agent, or to the pharmaceutically acceptable carrier, vehicle, or diluent which contains or is associated with the active agent. The targeting moiety may be any molecule that can bind to another molecule. For example, a targeting moiety may include an antibody or its antigen-binding fragments, a receptor molecule, a chimeric antibody molecule, or an affinity reagent. As used herein, the term "targeting moiety" refers to a structure that binds or associates with a biological moiety or fragment thereof. As noted, in some embodiments, the targeting moiety may be an antibody. In some embodiments, the targeting moiety may be a monoclonal antibody (mAb). In some embodiments, the targeting moiety may be an antibody fragment, surrogate, or variant. In some embodiments, the targeting moiety may be a protein ligand. In some embodiments, the targeting moiety may be a protein scaffold. In some embodiments, the targeting moiety may be a peptide. In some embodiments, the targeting moiety may be RNA or DNA. In some embodiments, the targeting moiety may be a RNA or DNA fragment. In some embodiments, the targeting moiety may be a small molecule ligand.

As used herein, "pure," or "substantially pure" means an object species is the predominant species present (i.e., on a molar basis it is more abundant than any other object species in the composition thereof), and particularly a substantially purified fraction is a composition wherein the object species comprises at least about 50 percent (on a molar basis) of all macromolecular species present. Generally, a substantially pure composition will comprise more than about 80% of all macromolecular species present in the composition, more particularly more than about 85%, more than about 90%, more than about 95%, or more than about 99%. The term "pure" or "substantially pure" also refers to preparations where the object species is at least 60% (w/w) pure, or at least 70% (w/w) pure, or at least 75% (w/w) pure, or at least 80% (w/w) pure, or at least 85% (w/w) pure, or at least 90% (w/w) pure, or at least 92% (w/w) pure, or at least 95% (w/w) pure, or at least 96% (w/w) pure, or at least 97% (w/w) pure, or at least 98% (w/w) pure, or at least 99% (w/w) pure, or 100% (w/w) pure.

Non-limiting examples of animals within the scope and meaning of this term include dogs, cats, rats, mice, guinea pigs, chinchillas, horses, goats, cattle, sheep, zoo animals, Old and New World monkeys, non-human primates, and humans.

"Treatment" refers to therapeutic treatments. "Prevention" refers to prophylactic or preventative treatment measures or reducing the onset of a condition or disease. The term "treating" refers to administering the active agent to a subject for therapeutic purposes and/or for prevention.

Non-limiting examples of modes of administration include oral, topical, retrobulbar, subconjunctival, transdermal, parenteral, subcutaneous, intranasal, intramuscular, intraperitoneal, intravitreal, and intravenous routes, including both local and systemic applications. In addition, the active agent of the present disclosure may be designed to provide delayed, controlled, extended, and/or sustained release using formulation techniques which are well known in the art.

The term "topical" is used herein to define a mode of administration through an internal or external epithelial surface, such as but not limited to, a material that is administered by being applied externally to the eye or a nasal mucosa. A non-limiting example of topical administration is through the use of eyedrops or through the use of a nasally-administered aerosol.

The terms "therapeutic composition" and "pharmaceutical composition" refer to an active agent-containing composition that may be administered to a subject by any method known in the art or otherwise contemplated herein, wherein administration of the composition brings about a therapeutic effect as described elsewhere herein. In addition, the compositions of the present disclosure may be designed to provide delayed, controlled, extended, and/or sustained release using formulation techniques which are well known in the art.

The term "effective amount" refers to an amount of the active agent which is sufficient to exhibit a detectable therapeutic or treatment effect in a subject without excessive adverse side effects (such as substantial toxicity, irritation and allergic response) commensurate with a reasonable benefit/risk ratio when used in the manner of the present disclosure. The effective amount for a subject will depend upon the subject's type, size and health, the nature and severity of the condition to be treated, the method of administration, the duration of treatment, the nature of concurrent therapy (if any), the specific formulations employed, and the like. Thus, it is not possible to specify an exact effective amount in advance. However, the effective amount for a given situation can be determined by one of ordinary skill in the art using routine experimentation based on the information provided herein.

The term "ameliorate" means a detectable or measurable improvement in a subject's condition or symptom thereof. A detectable or measurable improvement includes a subjective or objective decrease, reduction, inhibition, suppression, limit or control in the occurrence, frequency, severity, progression, or duration of the condition, or an improvement in a symptom or an underlying cause or a consequence of the condition, or a reversal of the condition. A successful treatment outcome can lead to a "therapeutic effect," or "benefit" of ameliorating, decreasing, reducing, inhibiting, suppressing, limiting, controlling or preventing the occurrence, frequency, severity, progression, or duration of a condition, or consequences of the condition in a subject.

A decrease or reduction in worsening, such as stabilizing the condition, is also a successful treatment outcome. A therapeutic benefit therefore need not be complete ablation or reversal of the condition, or any one, most or all adverse symptoms, complications, consequences or underlying causes associated with the condition. Thus, a satisfactory endpoint may be achieved when there is an incremental improvement such as a partial decrease, reduction, inhibition, suppression, limit, control or prevention in the occurrence, frequency, severity, progression, or duration, or inhibition or reversal of the condition (e.g., stabilizing), over a short or long duration of time (e.g., seconds, minutes, hours).

Unless otherwise defined herein, scientific and technical terms used in connection with the present disclosure shall have the meanings that are commonly understood by those having ordinary skill in the art. Further, unless otherwise required by context, singular terms shall include pluralities and plural terms shall include the singular. Where used herein, the specific term "single" is limited to only "one".

As utilized in accordance with the methods, compounds, and compositions of the present disclosure, the following terms, unless otherwise indicated, shall be understood to have the following meanings:

The use of the word "a" or "an" when used in conjunction with the term "comprising" in the claims and/or the specification may mean "one," but it is also consistent with the meaning of "one or more," "at least one," and "one or more than one." The use of the term "or" in the claims is used to mean "and/or" unless explicitly indicated to refer to alternatives only or when the alternatives are mutually exclusive, although the disclosure supports a definition that refers to only alternatives and "and/or." The use of the term "at least one" will be understood to include one as well as any quantity more than one, including but not limited to, 2, 3, 4, 5, 6, 7, 8, 9, 10, 15, 20, 30, 40, 50, 100, or any integer inclusive therein. The term "at least one" may extend up to 100 or 1000 or more, depending on the term to which it is attached; in addition, the quantities of 100/1000 are not to be considered limiting, as higher limits may also produce satisfactory results. In addition, the use of the term "at least one of X, Y and Z" will be understood to include X alone, Y alone, and Z alone, as well as any combination of X, Y and Z.

Where used herein, the pronoun "we" is intended to refer to all persons involved in a particular aspect of the investigation disclosed herein and as such may include non-inventor laboratory assistants and collaborators working under the supervision of the inventor.

As used herein, all numerical values or ranges include fractions of the values and integers within such ranges and fractions of the integers within such ranges unless the context clearly indicates otherwise. Thus, to illustrate, reference to a numerical range, such as 1-10 includes 1, 2, 3, 4, 5, 6, 7, 8, 9, 10, as well as 1.1, 1.2, 1.3, 1.4, 1.5, etc., and so forth. Reference to a range of 1-50 therefore includes 1, 2, 3, 4, 5, 6, 7, 8, 9, 10, 11, 12, 13, 14, 15, 16, 17, 18, 19, 20, etc., up to and including 50, as well as 1.1, 1.2, 1.3, 1.4, 1.5, etc., 2.1, 2.2, 2.3, 2.4, 2.5, etc., and so forth. Reference to a series of ranges includes ranges which combine the values of the boundaries of different ranges within the series. Thus, to illustrate reference to a series of ranges, for example, of 1-10, 10-20, 20-30, 30-40, 40-50, 50-60, 60-75, 75-100, 100-150, 150-200, 200-250, 250-300, 300-400, 400-500, 500-750, 750-1,000, includes ranges of 1-20, 10-50, 50-100, 100-500, and 500-1,000, for example. Reference to an integer with more (greater) or less than includes any number greater or less than the reference number, respectively. Thus, for example, reference to less than 100 includes 99, 98, 97, etc. all the way down to the number one (1); and less than 10 includes 9, 8, 7, etc., all the way down to the number one (1).

As used in this specification and claims, the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps.

The term "or combinations thereof" as used herein refers to all permutations and combinations of the listed items preceding the term. For example, "A, B, C, or combinations thereof" is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, AAB, BBC, AAABCCCC, CBBAAA, CABABB, and so forth. The skilled artisan will understand that typically there is no limit on the number of items or terms in any combination, unless otherwise apparent from the context.

Throughout this application, the terms "about" or "approximately" are used to indicate that a value includes the inherent variation of error for the composition, the method used to administer the active agent or composition, or the variation that exists among the study subjects. As used herein the qualifiers "about" or "approximately" are intended to include not only the exact value, amount, degree, orientation, or other qualified characteristic or value, but are intended to include some slight variations due to measuring error, manufacturing tolerances, stress exerted on various parts or components, observer error, wear and tear, and combinations thereof, for example. The term "about" or "approximately", where used herein when referring to a measurable value such as an amount, a temporal duration, and the like, is meant to encompass, for example, variations of ±20% or ±10%, or ±5%, or ±1%, or ±0.1% from the specified value, as such variations are appropriate to perform the disclosed methods and as understood by persons having ordinary skill in the art. As used herein, the term "substantially" means that the subsequently described event or circumstance completely occurs or that the subsequently described event or circumstance occurs to a great extent or degree. For example, the term "substantially" means that the subsequently described event or circumstance occurs at least 90% of the time, or at least 95% of the time, or at least 98% of the time.

As used herein any reference to "one embodiment" or "an embodiment" means that a particular element, feature, structure, or characteristic described in connection with the embodiment is included in at least one embodiment and may be included in other embodiments. The appearances of the phrase "in one embodiment" in various places in the specification are not necessarily all referring to the same embodiment and are not necessarily limited to a single or particular embodiment.

By "biologically active" is meant the ability of the active agent to modify the physiological system of an organism without reference to how the active agent has its physiological effects.

Effectiveness of a method or use, such as a treatment that provides a potential therapeutic benefit or improvement of a condition or disease, can be ascertained by various methods and testing assays.

The active agents disclosed herein can be used in the treatment of type 1 diabetes (T1D) and type 2 diabetes (T2D), and other diseases or conditions involving ER stress, including neurodegenerative diseases such as Parkinson's disease, amyotrophic lateral sclerosis (ALS), Alzheimer's disease (AD), Huntington's disease, and progressive supra nuclear palsy (PSP). Other indications also include metabolic syndrome including obesity, atherosclerosis, chronic heart disease, stroke, ischemia-reperfusion injury, and cancer.

The active agents of the present disclosure may be present in the pharmaceutical compositions at any concentration that allows the pharmaceutical composition to function in accordance with the present disclosure; for example, but not by way of limitation, the active agents may be present in the composition in a range having a lower level selected from 0.0001%, 0.005%, 0.001%, 0.005%, 0.01%, 0.05%, 0.1%, 0.2%, 0.3%, 0.4%, 0.5%, 0.6%, 0.7%, 0.8%, 0.9%, 1.0%, 1.1%, 1.2%, 1.3%, 1.4%, 1.5%, 1.6%, 1.7%, 1.8%, 1.9% and 2.0%; and an upper level selected from 3%, 3.5%, 4%, 4.5%, 5%, 5.5%, 6%, 6.5%, 7%, 7.5%, 8%, 8.5%, 9%, 9.5%, 10%, 11%, 12%, 13%, 14%, 15%, 16%, 17%, 18%, 19%, 20%, 25%, 30%, 35%, 40%, 45%, 50%, 55%, 60%, 65%, 70%, 75%, 80%, 85%, 90%, and 95%. Non-limiting examples of particular ranges include a range of from about 0.0001% to about 95%, a range of from about 0.001% to about 75%; a range of from about 0.005% to about 50%; a range of from about 0.01% to about 40%; a range of from about 0.05% to about 35%; a range of from about 0.1% to about 30%; a range of from about 0.1% to about 25%; a range of from about 0.1% to about 20%; a range of from about 1% to about 15%; a range of from about 2% to about 12%; a range of from about 5% to about 10%; and the like. Any other range that includes a lower level selected from the above-listed lower level concentrations and an upper level selected from the above-listed upper level concentrations also falls within the scope of the present disclosure.

Suitable carriers, vehicles, and other components that may be included in the formulation are described, for example, in *Remington: The Science and Practice of Pharmacy*, $21^{st}$ Ed. and $22^{nd}$ Ed. The term "pharmaceutically acceptable" means that the carrier is a non-toxic material that does not interfere with the effectiveness of the biological activity of the active agent. The characteristics of the carrier will depend on various factors, including but not limited to, the route of administration.

For example, but not by way of limitation, the active agent may be dissolved in a physiologically acceptable pharmaceutical carrier or diluent and administered as either a solution or a suspension. Non-limiting examples of suitable pharmaceutically acceptable carriers include water, saline, dextrose solutions, fructose solutions, ethanol, or oils of animal, vegetative, or synthetic origin, or any combination thereof. A sterile diluent, which may contain materials generally recognized for approximating physiological conditions and/or as required by governmental regulations, may be employed as the pharmaceutically acceptable carrier. In this respect, the sterile diluent may contain a buffering agent to obtain a physiologically acceptable pH, such as (but not limited to) sodium chloride, saline, phosphate-buffered saline, and/or other substances which are physiologically acceptable and/or safe for use.

The pharmaceutical compositions may also contain one or more additional components in addition to the active agent and pharmaceutically acceptable carrier(s) (and other additional therapeutically active agent(s), if present). Examples of additional components that may be present include, but are not limited to, diluents, fillers, salts, buffers, preservatives, stabilizers, solubilizers, and other materials well known in the art. Another particular non-limiting example of an additional component that may be present in the pharmaceutical composition is a delivery agent, as discussed in further detail herein below.

Other embodiments of the pharmaceutical compositions of the present disclosure may include the incorporation or entrapment of the active agent in various types of drug delivery systems that function to provide targeted delivery, controlled release, and/or increased half-life to the active agent. For example, but not by way of limitation, it is possible to entrap the active agent in microcapsules prepared by coacervation techniques or by interfacial polymerization (for example, hydroxymethylcellulose or gelatin-microcapsules and poly-(methylmethacylate) microcapsules, respectively). It is also possible to entrap the active agent in macroemulsions or colloidal drug delivery systems (such as but not limited to, liposomes, albumin microspheres, microemulsions, nanoparticles, nanocapsules, and the like). Such techniques are well known to persons having ordinary skill in the art, and thus no further description thereof is deemed necessary.

In one particular, non-limiting example, the pharmaceutical composition may include a liposome in which the active agent is disposed. In addition to other pharmaceutically acceptable carrier(s), the liposome may contain amphipathic agents such as lipids which exist in an aggregated form as micelles, insoluble monolayers, liquid crystals, or lamellar layers in aqueous solution. Suitable lipids for liposomal formulation include, but are not limited to, monoglycerides, diglycerides, sulfatides, lysolecithin, phospholipids, saponin, bile acids, combinations thereof, and the like. Preparation of such liposomal formulations is well within the level of ordinary skill in the art, as disclosed, for example, in U.S. Pat. Nos. 4,235,871; 4,501,728; 4,837,028; and 4,737,323; the entire contents of each of which are incorporated herein by reference.

In other non-limiting examples, the active agent of the present disclosure may be incorporated into particles of one or more polymeric materials, as this type of incorporation can be useful in controlling the duration of action of the active agent by allowing for controlled release from the preparations, thus increasing the half-life thereof. Non-limiting examples of polymeric materials that may be utilized in this manner include polyesters, polyamides, polyamino acids, hydrogels, poly(lactic acid), ethylene vinylacetate copolymers, copolymer micelles of, for example, PEG and poly(1-aspartamide), and combinations thereof.

The pharmaceutical compositions described or otherwise contemplated herein may further comprise at least one delivery agent, such as a targeting moiety, that assists in delivery of the active agent to a desired site of delivery, such as a pancreatic beta cell.

The compositions of the present disclosure may be formulated for administration by any other method known or otherwise contemplated in the art, as long as the route of administration allows for delivery of the active agent so that the compounds can function in accordance with the present disclosure, e.g., to reduce ER stress. Examples of other routes of administration include, but are not limited to, oral, topical, retrobulbar, subconjunctival, transdermal, parenteral, subcutaneous, intranasal, intramuscular, intraperitoneal, intravitreal, and intravenous routes, including both local and systemic application routes.

Another non-limiting embodiment of the present disclosure is directed to a kit that contain one or more of any of the pharmaceutical compositions described or otherwise contemplated herein. The kit may further contain a second agent as described herein above for use concurrently with the pharmaceutical composition(s). If the composition present in the kit is not provided in the form in which it is to be delivered, the kit may further contain a pharmaceutically acceptable carrier, vehicle, diluent, or other agent for mixing with the active agent for preparation of the pharmaceutical composition. The kit including the composition and/or other reagents may also be packaged with instructions packaged for administration and/or dosing of the compositions contained in the kit. The instructions may be fixed in any tangible medium, such as printed paper, or a computer-readable magnetic or optical medium, or instructions to reference a remote computer data source such as a world-wide web page accessible via the internet.

The kit may contain single or multiple doses of the pharmaceutical composition which contains the active agent. When multiple doses are present, the doses may be disposed in bulk within a single container, or the multiple doses may be disposed individually within the kit; that is, the pharmaceutical compositions may be present in the kit in unit dosage forms to facilitate accurate dosing. The term "unit dosage forms" as used herein refers to physically discrete units suitable as unitary dosages for human subjects and other mammals; each unit contains a predetermined quantity of the active agent calculated to produce the desired therapeutic effect, in association with a suitable pharmaceutical excipient. Typical unit dosage forms of liquid compositions include prefilled, premeasured ampules or syringes; for solid compositions, typical unit dosage forms include pills, tablets, capsules, or the like. In such compositions, the active agent may sometimes be a minor component (from about 0.1 to about 50% by weight, such as but not limited to, from about 1 to about 40% by weight) with the remainder being various vehicles or carriers and processing aids helpful for forming the desired dosing form.

The active agent may be provided as a "pharmaceutically acceptable salt," which refers to salts that retain the biological effectiveness and properties of a compound and, which are not biologically or otherwise undesirable for use in a pharmaceutical. In many cases, the compounds disclosed herein are capable of forming acid and/or base salts by virtue of the presence of amino and/or carboxyl groups or groups similar thereto. Pharmaceutically acceptable acid addition salts can be formed with inorganic acids and organic acids. Inorganic acids from which salts can be derived include, for example, hydrochloric acid, hydrobromic acid, sulfuric acid, nitric acid, phosphoric acid, and the like. Organic acids from which salts can be derived include, for example, acetic acid, propionic acid, glycolic acid, pyruvic acid, oxalic acid, maleic acid, malonic acid, succinic acid, fumaric acid, tartaric acid, citric acid, benzoic acid, cinnamic acid, mandelic acid, methanesulfonic acid, ethanesulfonic acid, p-toluenesulfonic acid, salicylic acid, and the like. Pharmaceutically acceptable base addition salts can be formed with inorganic and organic bases. Inorganic bases from which salts can be derived include, for example, sodium, potassium, lithium, ammonium, calcium, magnesium, iron, zinc, copper, manganese, aluminum, and the like; particularly preferred are the ammonium, potassium, sodium, calcium and magnesium salts. Organic bases from which salts can be derived include, for example, primary, secondary, and tertiary amines, substituted amines including naturally occurring substituted amines, cyclic amines, basic ion exchange resins, and the like, specifically such as isopropylamine, trimethylamine, diethylamine, triethylamine, tripropylamine, and ethanolamine. Many such salts are known in the art, as described in WO 87/05297 (incorporated by reference herein in its entirety).

The amount of the active agent that is effective in the treatment described herein can be determined by the attending diagnostician, as one of ordinary skill in the art, by the use of conventional techniques and by observing results obtained under analogous circumstances. In determining the therapeutically effective dose, a number of factors may be considered by the attending diagnostician, including, but not limited to: the species of the subject; its size, age, and general health; the specific diseases or other conditions involved; the degree, involvement, and/or severity of the diseases or conditions; the response of the individual subject; the particular active agent administered; the mode of administration; the bioavailability characteristics of the preparation administered; the dose regimen selected; the use of concomitant medication; and other relevant circumstances. A therapeutically effective amount of an active agent of the present disclosure also refers to an amount of the active agent which is effective in controlling, reducing, or ameliorating the condition to be treated.

Practice of the method of the present disclosure may include administering to a subject a therapeutically effective amount of the pharmaceutical composition (containing the active agent in any suitable systemic and/or local formulation, in an amount effective to deliver the dosages listed above. The dosage can be administered, for example, but not by way of limitation, on a one-time basis, or administered at multiple times (for example, but not by way of limitation, from one to five times per day, or once or twice per week). The pharmaceutical composition may be administered either alone or in combination with other therapies, in accordance with the inventive concepts disclosed herein.

Compositions of the active agent can be administered in a single dose treatment or in multiple dose treatments on a schedule and over a time period appropriate to the age, weight and condition of the subject, the particular composition used, and the route of administration. In one embodiment, a single dose of the composition according to the disclosure is administered. In other embodiments, multiple doses are administered. The frequency of administration can vary depending on any of a variety of factors, e.g., severity of the symptoms, or whether the composition is used for prophylactic or curative purposes. For example, in certain embodiments, the composition is administered once per month, twice per month, three times per month, every other week, once per week, twice per week, three times per week, four times per week, five times per week, six times per week, every other day, daily, twice a day, or three times a day. The duration of treatment, e.g., the period of time over which the composition is administered, can vary, depending on any of a variety of factors, e.g., subject response. For example, the composition can be administered over a period of time ranging from about one day to about one week, from about two weeks to about four weeks, from about one month to about two months, from about two months to about four months, from about four months to about six months, from about six months to about eight months, from about eight months to about 1 year, from about 1 year to about 2 years, or from about 2 years to about 4 years, or more.

The compositions can be combined with a pharmaceutically acceptable carrier (excipient) or vehicle to form a pharmacological composition. Pharmaceutically acceptable carriers can contain a physiologically acceptable compound that acts to, e.g., stabilize, or increase or decrease the absorption or clearance rates of the pharmaceutical compositions. Physiologically acceptable carriers and vehicles can include, for example, carbohydrates, such as glucose, sucrose, or dextrans, antioxidants, such as ascorbic acid or glutathione, chelating agents, low molecular weight proteins, detergents, liposomal carriers, or excipients or other stabilizers and/or buffers. Other physiologically acceptable compounds, carriers, and vehicles include wetting agents, emulsifying agents, dispersing agents or preservatives.

When administered orally, the present compositions may be protected from digestion. This can be accomplished either by complexing the active agent with a composition to render it resistant to acidic and enzymatic hydrolysis or by packaging active agent in an appropriately resistant carrier such as a liposome, e.g., such as shown in U.S. Pat. No. 5,391,377.

For transmucosal or transdermal administration, penetrants appropriate to the barrier to be permeated can be used in the formulation. Such penetrants are generally known in the art, and include, e.g., for transmucosal administration, bile salts and fusidic acid derivatives. In addition, detergents can be used to facilitate permeation. Transmucosal administration can be through nasal sprays or using suppositories.

For topical, transdermal administration, the agents are formulated into ointments, creams, salves, powders and gels. Transdermal delivery systems can also include, e.g., patches. The present compositions can also be administered in sustained delivery or sustained release mechanisms. For example, biodegradeable microspheres or capsules or other biodegradeable polymer configurations capable of sustained delivery of the active agent can be included herein.

For inhalation, the active agent can be delivered using any system known in the art, including dry powder aerosols, liquids delivery systems, air jet nebulizers, propellant systems, and the like. For example, the pharmaceutical formulation can be administered in the form of an aerosol or mist. For aerosol administration, the formulation can be supplied in finely divided form along with a surfactant and propellant. In another aspect, the device for delivering the formulation to respiratory tissue is an inhaler in which the formulation vaporizes. Other liquid delivery systems include, e.g., air jet nebulizers.

The active agent can be delivered alone or as pharmaceutical compositions by any means known in the art, e.g., systemically, regionally, or locally; by intra-arterial, intrathecal (IT), intravenous (IV), parenteral, intra-pleural cavity, topical, oral, or local administration, as subcutaneous, intra-tracheal (e.g., by aerosol) or transmucosal (e.g., buccal, bladder, vaginal, uterine, rectal, nasal mucosa).

In one aspect, the pharmaceutical formulations comprising the active agent are incorporated in lipid monolayers or bilayers, e.g., liposomes, such as shown in U.S. Pat. Nos. 6,110,490; 6,096,716; 5,283,185; and 5,279,833. Liposomes and liposomal formulations can be prepared according to standard methods and are also well known in the art, such as U.S. Pat. Nos. 4,235,871; 4,501,728 and 4,837,028.

In one aspect, the active agent is prepared with one or more carriers that will protect the active agent against rapid elimination from the body, such as a controlled release formulation, including implants and microencapsulated delivery systems. Biodegradable, biocompatible polymers can be used, such as ethylene vinyl acetate, polyanhydrides, polyglycolic acid, collagen, polyorthoesters, and polylactic acid. Methods for preparation of such formulations will be apparent to those skilled in the art.

The active agent in general may be formulated to obtain compositions that include one or more pharmaceutically suitable excipients, surfactants, polyols, buffers, salts, amino acids, or additional ingredients, or some combination of these. This can be accomplished by known methods to prepare pharmaceutically useful dosages, whereby the active agent is combined in a mixture with one or more pharmaceutically suitable excipients. Sterile phosphate-buffered saline is one example of a pharmaceutically suitable excipient.

Examples of routes of administration of the active agents described herein include parenteral injection, e.g., by subcutaneous, intramuscular or transdermal delivery. Other forms of parenteral administration include intravenous, intraarterial, intralymphatic, intrathecal, intraocular, intracerebral, or intracavitary injection. In parenteral administration, the compositions will be formulated in a unit dosage injectable form such as a solution, suspension or emulsion, in association with a pharmaceutically acceptable excipient. Such excipients are inherently nontoxic and nontherapeutic. Examples of such excipients are saline, Ringer's solution, dextrose solution and Hanks' solution. Nonaqueous excipients such as fixed oils and ethyl oleate may also be used. An alternative excipient is 5% dextrose in saline. The excipient may contain minor amounts of additives such as substances that enhance isotonicity and chemical stability, including buffers and preservatives.

Formulated compositions comprising the active agent can be used for subcutaneous, intramuscular or transdermal administration. Compositions can be presented in unit dosage form, e.g., in ampoules or in multi-dose containers, with an added preservative. Compositions can also take such forms as suspensions, solutions or emulsions in oily or aqueous vehicles, and can contain formulatory agents such as suspending, stabilizing and/or dispersing agents. Alternatively, the compositions can be in powder form for constitution with a suitable vehicle, e.g., sterile pyrogen-free water, before use.

The active agents may be administered in solution. The formulation thereof may be in a solution having a suitable pharmaceutically acceptable buffer such as phosphate, Tris (hydroxymethyl) aminomethane-HCl or citrate, and the like. Buffer concentrations should be in the range of 1 to 100 mM. The formulated solution may also contain a salt, such as sodium chloride or potassium chloride in a concentration of 50 to 150 mM. An effective amount of a stabilizing agent such as mannitol, trehalose, sorbitol, glycerol, albumin, a globulin, a detergent, a gelatin, a protamine or a salt of protamine may also be included.

For example, but not by way of limitation, the therapeutically effective amount of an active agent used in the present disclosure will generally contain sufficient active agent to deliver in a range of from about 0.01 µg/kg to about 10 mg/kg (weight of active agent/body weight of patient). For example, but not by way of limitation, the composition will deliver about 0.1 µg/kg to about 5 mg/kg, and more particularly about 1 µg/kg to about 1 mg/kg.

Exemplary, non-limiting ranges for a therapeutically or prophylactically effective amount of the active agent include but are not limited to 0.001 mg/kg of the subject's body weight to 100 mg/kg of the subject's body weight, more typically 0.01 mg/kg to 100 mg/kg, 0.1 mg/kg to 50 mg/kg, 0.1 mg/kg to 40 mg/kg, 1 mg/kg to 30 mg/kg, or 1 mg/kg to 20 mg/kg, or 2 mg/kg to 30 mg/kg, 2 mg/kg to 20 mg/kg, 2 mg/kg to 15 mg/kg, 2 mg/kg to 12 mg/kg, or 2 mg/kg to 10 mg/kg, or 3 mg/kg to 30 mg/kg, 3 mg/kg to 20 mg/kg, 3 mg/kg to 15 mg/kg, 3 mg/kg to 12 mg/kg, or 3 mg/kg to 10 mg/kg, or 5 mg to 1500 mg, as a fixed dosage.

The composition is formulated to contain an effective amount of the active agent, wherein the amount depends on the animal to be treated and the condition to be treated. In certain embodiments, the active agent is administered at a dose ranging from about 0.001 mg to about 10 g, from about 0.01 mg to about 10 g, from about 0.1 mg to about 10 g, from about 1 mg to about 10 g, from about 1 mg to about 9 g, from about 1 mg to about 8 g, from about 1 mg to about 7 g, from about 1 mg to about 6 g, from about 1 mg to about 5 g, from about 10 mg to about 10 g, from about 50 mg to about 5 g, from about 50 mg to about 5 g, from about 50 mg to about 2 g, from about 0.05 µg to about 1.5 mg, from about 10 µg to about 1 mg protein, from about 30 µg to about 500 µg, from about 40 µg to about 300 µg, from about 0.1 µg to about 200 mg, from about 0.1 µg to about 5 µg, from about 5 µg to about 10 µg, from about 10 µg to about 25 µg, from about 25 µg to about 50 µg, from about 50 µg to about 100 µg, from about 100 µg to about 500 µg, from about 500 µg to about 1 mg, from about 1 mg to about 2 mg. The specific dose level for any particular subject depends upon a variety of factors including the activity of the specific peptide, the age, body weight, general health, sex, diet, time of administration, route of administration, and rate of excretion, drug combination and the severity of the particular disease undergoing therapy.

The dosage of an administered active agent for humans will vary depending upon such factors as the patient's age, weight, height, sex, general medical condition and previous medical history. In certain non-limiting embodiments, the recipient is provided with a dosage of the active agent that is in the range of from about 1 mg to 1000 mg as a single infusion or single or multiple injections, although a lower or higher dosage also may be administered. The dosage may be in the range of from about 25 mg to 100 mg of the active agent per square meter ($m^2$) of body surface area for a typical adult, although a lower or higher dosage also may be administered. Examples of dosages that may be administered to a human subject further include, for example, 1 to 500 mg, 1 to 70 mg, or 1 to 20 mg, although higher or lower doses may be used. Dosages may be repeated as needed, for example, once per week for 4-10 weeks, or once per week for 8 weeks, or once per week for 4 weeks. It may also be given less frequently, such as every other week for several months, or more frequently, such as twice weekly or by continuous infusion.

Where used herein alkyls, alkoxyls, haloalkyls, and haloalkoxyls are generally intended to refer to molecules having hydrocarbon chains that comprise 1, 2, 3, 4, 5, 6, 7, 8, 9, 10, 11, or 12 carbons, unless otherwise designated. The hydrocarbon chains may be straight or branched. Examples of alkyls include but are not limited to methyl, ethyl, propyl, isopropyl, and butyl. Alkoxy denotes an alkyl group which is linked to an oxygen atom. Examples of alkoxyls include but are not limited to methoxyl, ethoxyl, propoxyl, isopropoxyl, and butoxyl. Haloalkyls and haloalkoxyls are alkyls and alkoxyls which comprise at least one halogen atom such as chlorine, fluorine, bromine, or iodine.

In at least certain embodiments, the present disclosure includes compounds and methods of treating disorders and conditions related to ER stress, including, but not limited to type 1 diabetes and type 2 diabetes (or other disorders or conditions described elsewhere herein). The compound may be a hydroxybenzamide derivative compound having chemical structure I:

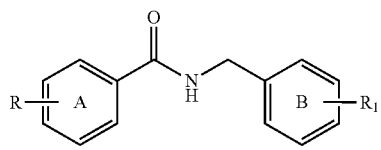

I wherein,

R is selected from 2-OH, 3-OH, 4-OH, 5-OH, 2,3-diOH, 2,4-diOH, 2,5-diOH, 3,4-diOH, 3,5-diOH, and 4,5-diOH; and $R_1$ is selected from 2-monohaloalkyl, 3-monohaloalkyl, 4-monohaloalkyl, 5-monohaloalkyl, 2-dihaloalkyl, 3-dihaloalkyl, 4-dihaloalkyl, 5-dihaloalkyl, 2-trihaloalkyl, 3-trihaloalkyl, 4-trihaloalkyl, and 5-trihaloalkyl, wherein halo is selected from chlorine (Cl), fluorine (F), bromine (Br), and iodine (I).

EXAMPLES

Certain novel embodiments of the present disclosure, having now been generally described, will be more readily understood by reference to the following examples, which are included merely for purposes of illustration of certain aspects and embodiments of the present disclosure, and are not intended to be limiting. The following detailed examples are to be construed, as noted above, only as illustrative, and not as limiting of the present disclosure in any way whatsoever. Those skilled in the art will promptly recognize appropriate variations from the various compositions, structures, components, procedures, and methods.

Methods

Cell Culture

INS-1 cells were cultured in RPMI 1640 medium (Corning) supplemented with 10% FBS (Atlanta Biologicals), 10 mM HEPES (Gibco-Life Technologies), 1 mM sodium pyruvate (Corning), 50 μM 2-mercaptoethanol (Sigma-Aldrich), and antibiotics (100 UI/mL penicillin and 100 μg/mL streptomycin; Corning) and maintained in a humidified 5% $CO_2$ atmosphere at 37° C. Tunicamycin (Tm) was obtained from Sigma-Aldrich (St Louis, MO) and was dissolved in DMSO for experiments.

Cell Viability Assay

INS-1 cells were resuspended in RPMI 1640 medium containing 10% FBS and seeded at $5 \times 10^3$ cells/well in a 384-well plate. After overnight 24 h incubation, compounds were added to the wells at the indicated concentration using a pin-transfer robot (PerkinElmer). Tm in RPMI 1640 medium containing 10% FBS was then added at a final concentration of 0.15 μg/mL. After 72 h, the medium was removed and 20 μL of CellTiter-Glo reagent (Promega) was added. Luminescence was measured 10 min later using a Synergy Neo2 plate reader (Biotek).

RNA Isolation and qRT-PCR

Total RNA was extracted from INS-1 cells using TRIzol reagent (Invitrogen, Carlsbad, CA) according to the manufacturer's protocol. 2 μg of total RNA was reverse transcribed using Superscript IV kit (Invitrogen). Real-time PCR was performed with a CFX96 Real-Time PCR detection system (Bio-Rad, CA) using SYBR Select Master Mix (Applied Biosystems, CA).

Relative mRNA levels were normalized against Cyclophilin A and were determined by ΔΔCt calculated from the difference in ΔCt values between the target gene and Cyclophilin A with and without treatment, based on comparative CT (cycle threshold) method. The primer sequences used were:

```
Rat CHOP:
Forward (F):
                                   (SEQ ID NO: 1)
5'-GAAATCGAGCGCCTGACCAG-3'
and Reverse (R):
                                   (SEQ ID NO: 2)
5'-GGAGGTGATGCCAACAGTTCA-3'.

Rat ATF4:
F:
                                   (SEQ ID NO: 3)
5'- TCCTGAACAGCGAAGTGTTG-3'
and R:
                                   (SEQ ID NO: 4)
5'- GTGTCTGAGGCACTGACCAA-3'.
```

```
                -continued
        Rat Bip:
        F:
                                     (SEQ ID NO: 5)
        5'-CTATTCCTGCGTCGGTGTATT-3' and
        R:
                                     (SEQ ID NO: 6)
        5'-GGTTGGACGTGAGTTGGTTCT-3'.

Rat XBP1s:
        F:
                                     (SEQ ID NO: 7)
        5'- CTGAGTCCGAATCAGGTGCAG-3'
        and R:
                                     (SEQ ID NO: 8)
        5'- ATCCATGGGAAGATGTTCTGG-3'.

Rat Cyclophilin A:
        F:
                                     (SEQ ID NO: 9)
        5'-GGTGACTTCACACGCCATAA-3' and
        R:
                                     (SEQ ID NO: 10)
        5'-CTTCCCAAAGACCACATGCT-3'
```

Western Blotting

INS-1 cells cultured in in 60-mm dishes were washed with PBS and lysed with lysis buffer (Cell Signaling Technology, Danvers, MA) containing protease and phosphatase inhibitors (Thermo). Aliquots of 20 µg total protein were separated on 10% SDS-PAGE gels (Life Technologies) and transferred to PVDF membranes (Life Technologies). The membranes were probed with primary antibodies followed by the appropriate HRP-conjugated secondary antibodies. Blots were then developed using Pierce ECL Western Blotting Substrate (cat no 32106). The primary antibodies and dilutions used were: cleaved caspase 3 (1:1000, 9661, Cell Signaling Technology, MA, USA), and PARP (1:1000, 9542L, Cell Signaling Technology), and GAPDH (1:1000, SC-32233, Santa Cruz Biotechnology). Secondary antibodies used: goat anti rabbit IgG and goat anti-mouse IgG, 1:5000; Santa Cruz Biotechnology, Santa Cruz, CA).

Chemicals

All commercial chemicals were used as obtained and all solvents were purified by the standard procedures prior to use. Flash column chromatography was performed with E Merck silica gel (230-400 mesh). NMR spectra were measured against the peak of tetramethylsilane by Varain Unity Inova 400 NMR (400 MHz) spectrometers. All tested compounds were evaluated on the Agilent HPLC systems using ACE-C18 column (250×4.6 mm) was used as the stationary phase. HPLC conditions include a flow rate of 1.0 mL/min using water and acetonitrile as solvents and a detection wavelength of 254 nm and determined to be ≥95% pure.

HPLC

HPLC was performed using an Azura P 6.1L HPLC system (Knauer, Berlin, Germany) with a UV-1 detector set at λ=254 nm. The samples were separated on a Sonoma C18, 10 µm, 4.6×250 mm using water-acetonitrile gradient 5-95% at 1.5 mL/min.

General Procedure for the Synthesis of Imidazole Analogs 1a-1c

To a stirred solution of 2-oxo-2-(4-(trifluoromethyl)phenyl)acetaldehyde (1 equivalents) in ethanol was added substituted arylaldehyde (1.2 equivalents) and ammonium acetate (5 equivalents). Reaction mixture was refluxed for 6-8 h, then the solvent was evaporated, and the residue was purified by column chromatography using dichloromethane and methanol mobile phase.

General Procedure for the Synthesis of 2-Amino Imidazole's (2a, 2b)

2-Amino Imidazole derivatives were prepared according to: Ermolat'ev, D. S. et al., 2008. A Divergent Synthesis of Substituted 2-Aminoimidazoles from 2-Aminopyrimidines. *The Journal of Organic Chemistry* 73 (17), 6691-6697.

General Procedure for the Synthesis of Benzamide Analogs (3a-3t)

To a mixture of the acid derivative (1 equivalent) in DCM was added DIPEA (3 equivalents) and HATU (1 equivalent). The mixture was stirred for 5 min, and then the appropriate amine (1 equivalent) was added. The reaction mixture was stirred at rt for 30 min. The reaction was monitored by TLC, upon completion of starting material, the solvent was removed in vacuo then the crude was purified by flash chromatography to provide product.

Chemistry

Reactions for the synthesis of compounds studied herein are outlined in Scheme 1, and substituents of R and $R^1$ are listed in Tables 1, 2, and 3. Imidazole analogs 1a-c were prepared using ammonium acetate in ethanol refluxing temperatures. Amino imidazoles 2a and 2b were prepared in multistep synthesis according to the methods of Ermolat'ev, D. S. et al., 2008, op. cit. Commercially available substituted benzoic acids (3) or substituted phenylacetic acid (4) were coupled with corresponding substituted benzylamine in the presence of HATU/DIPEA in dichloromethane to yield hydroxy benzamides (3a-t) and hydroxyl phenylacetamide 4a. Urea analogs of 5a, 5b were synthesized using triphosgene, and TEA conditions. Brief procedures of all schemes are provided in experimental sections and synthesized compounds were characterized by physical and spectral analysis data that confirmed their assigned structures.

Scheme 1 Synthesis of β cell ER stress modulators.

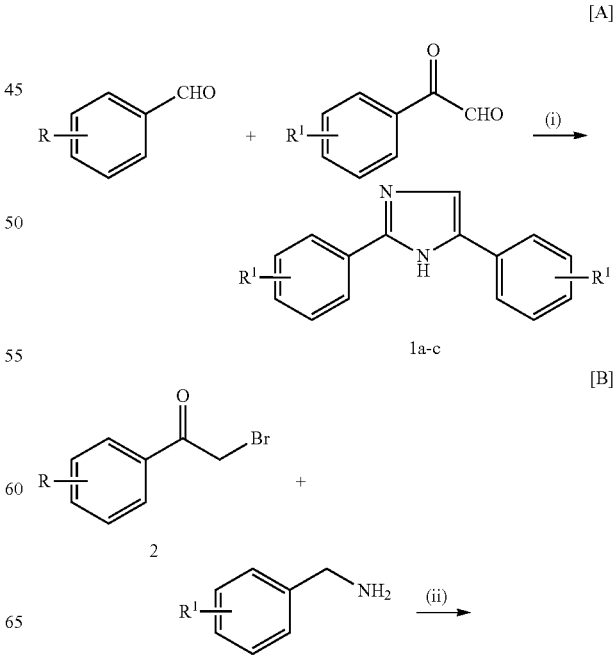

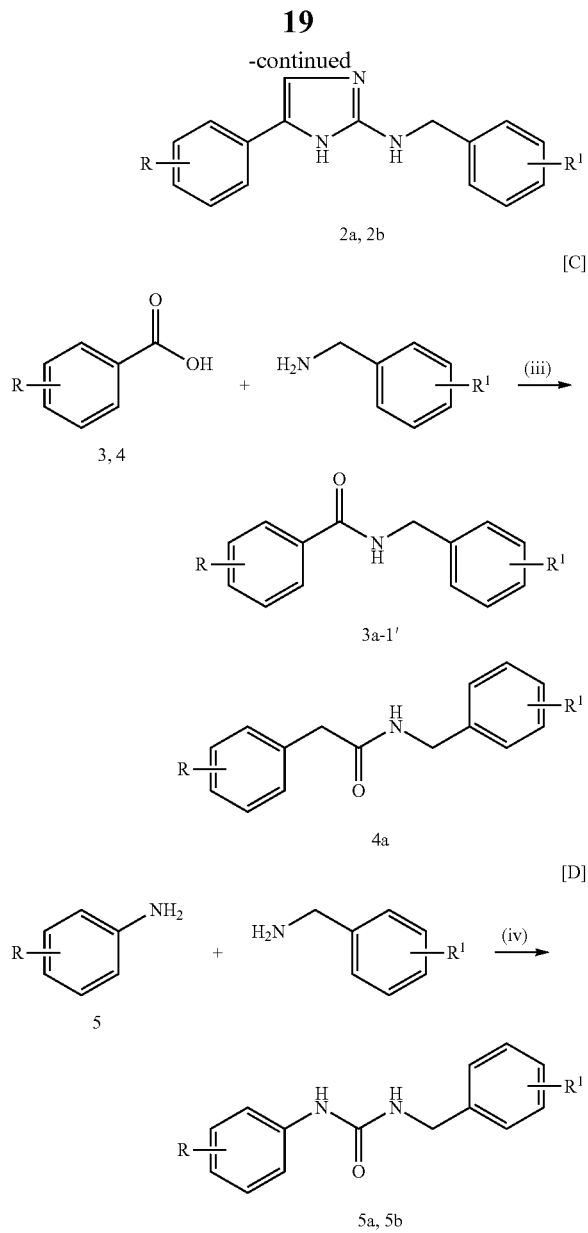

Reagents and Conditions: (i) NH₄OAc, EtOH, 5 h reflux; (ii) multi step synthesis[22] (iii) HATU, DIPEA, Dichloromethane at 0-5° C.; (iv) triphosgene, TEA, THF, 0-5° C;

Results

In earlier work, we identified an ER stress modulator 1-(3-chloro-2-methylphenyl)-N-(2,5-dimethylphenyl)-5-methyl-1H-1,2,3-triazole-4-carboxamide) that protects β-cell function and survival against ER stress with maximal activity at 87% and an $EC_{50}$ value of about 2.8 μM. Several small peptide analogs were discovered to possess better potency and with improved aqueous solubility profiles (Eeda, V. et al., 2020, Discovery of N-(2-(Benzylamino)-2-oxoethyl)benzamide analogs as a novel scaffold of pancreatic β-cell protective agents against endoplasmic reticulum stress. Chem Biol Drug Des, 95 (3), 388-393). Although the small peptide derivatives exhibited better profiles of β-cell protection, the existence of numerous rotatable bonds in these molecules may increase the chance of potential off-target interactions. We therefore endeavored to identify new derivatives to limit the numbers of rotatable bonds with the intention to lock molecules into a desired active conformation(s).

Hydroxy benzamide (HBA) derivatives were synthesized based on various scaffolds and evaluated for their viability of rat INS-1 β cells in the presence of tunicamycin (Tm), a potent ER stress inducer that inhibits N-linked glycosylation of proteins. The maximum activities and the concentrations that reach half-maximal activity ($EC_{50}$) of the compounds were evaluated by the degree of increase in viability of INS-1 cells co-treated with the compounds in the presence of Tm compared with Tm treatment alone.

First, we synthesized conformationally locked imidazole compounds (1a-c) by replacing the triazole ring with the imidazole moiety. Compound 1a with di-hydroxyl substitution in the left (A) ring (R) displayed some β-cell protective activity at sub-micro molar concentrations but became toxic when the compound concentration arose (Table 1). Substitution with a combination of methoxy and hydroxyl moieties (1b) or methoxy only (1c) showed no improvement either, suggesting replacing the triazole with any five membered heterocycle did not show improvement in potency, suggesting that a completely conformationally restricted imidazole backbone with —OMe, or —OH substituted scaffolds may not be suitable for this biological activity. Next, we modified imidazoles to 2-amino imidazole, which has flexible amino group outside of heterocycle group (2a, 2b). As a result, compound 2a with methoxy substituent on A-ring (R) and 4-$CF_3$ on B-ring ($R^1$) showed similar maximal protection activity (Scheme 1). Substituting the compound with a methoxy substituent on B ring ($R^1$) while keeping the same on the left ring (2b) reduced the protecting activity, suggesting that —$CF_3$ group on the B-ring may be beneficial for activity.

TABLE 1

Imidazole, and 2-Amino Imidazole analogs and their Biological Evaluation

| Comp. No. | Scaffold | R | $R^1$ | Maximum % of Protection at Concentration (μM)[a] | $EC_{50}$ (μM)[b] |
|---|---|---|---|---|---|
| 1 | Triazole | 4-Et | 2-Me, 3-Cl | 87 (10) | 2.8 |
| 1a | | 2,3-OH | 4-$CF_3$ | 14 (0.3) | 0.26 |
| 1b | Imidazole | 3-OMe,4-OH | 4-$CF_3$ | 7 (0.3) | 0.26 |

TABLE 1-continued

| | | | | | |
|---|---|---|---|---|---|
| 1c | | 4-OMe | 4-CF$_3$ | 17 (0.3) | 0.21 |
| 2a | 2-Amino | 4-OMe | 4-CF$_3$ | 18 (0.1) | 0.05 |
| 2b | Imidazole | 4-OMe | 2-OMe | 9 (0.05) | 0.021 |

[a]% Protection value is the maximal activity a compound possesses, reported as % rescue from Tm (0.15 μg/mL)—induced reduction of cell viability, as measured by intracellular ATP levels[24]; the values for Tm treatment alone and control (DMSO, without Tm) treatment are designated as 0% and 100%, respectively.
[b]EC$_{50}$ values (the concentrations that reach half-maximal activity) for INS-1 cell viability are calculated with GraphPad Prism from the data of ten 2-fold serial titration points in all tables.
All experiments were performed in triplicate.

We next focused on the amide linker in the place of triazole and synthesized compounds with various substituents on the A-rings and B-rings of a benzamide structure (Table 2). We first synthesized compound 3a with 2-Me, 3-Cl substituents on the A-ring. It showed 83% maximal protection (Table 2) with EC$_{50}$ value at 10 μM. These results suggest that the amide linker replacement for triazole ring is active for β-cell protection.

maximal activity to 3b. As the 3-OH in 3c maintained certain activity, we then tested whether di —OH groups on the A-ring affect their β-cell protective activity. With the same -3-CF$_3$ at B-ring, compound 3d with 3, 4-di OH substituents on A-ring displayed improvement in β-cell protective activity relative to 3c (51% maximal protection for 3d, and 37% maximal protection for 3c). Interestingly, compound 3e with 3-OMe, 4-OH substituents on A-ring also displayed marked improvement in β-cell protective activity with a perfect (100%) maximal protection. However, we noticed that these derivatives achieved their favorable β-cell protection only at fairly high concentrations (>10 μM).

We next explored whether changing —CF$_3$ position on the B-ring from position 3 to 4 improves β-cell protective activity. 3f with -4-CF$_3$ on the B-ring but otherwise identical to 3d (with 3, 4-di OH substituents on A-ring for both) showed 100% maximal protection at 10 PM, a significant improvement over 3d (51% maximal protection at 40 μM).

TABLE 2

Benzamide analogs and their Biological Evaluation

| Comp. No. | Scaffold | R | R$^1$ | Maximum % of Protection at Concentration (μM)[a] | EC$_{50}$ (μM)[b] |
|---|---|---|---|---|---|
| 3a | | 2-Me, 3-Cl | 3-CF$_3$ | 83 (40) | 10 |
| 3b | | 4-Et | 3-CF$_3$ | 43 (20) | 4.4 |
| 3c | | 3-OH | 3-CF$_3$ | 37 (20) | 9.9 |
| 3d | | 3,4-di OH | 3-CF$_3$ | 51 (40) | 20.5 |
| 3e | | 3-OMe,4-OH | 3-CF$_3$ | 100 (20) | 3.1 |
| 3f | | 3,4-di OH | 4-CF$_3$ | 100 (10) | 2.2 |
| 3g | | 2,3-di OH | 4-CF$_3$ | 100 (20) | 3.1 |
| 3h | | 4-OH | 4-CF$_3$ | 100 (10) | 0.27 |
| 3i | | 3-OH | 4-CF$_3$ | 100 (1.2) | 0.19 |
| 3j | | 3-OMe | 4-CF$_3$ | 71 (40) | 25 |
| 3k | Benzamide | 3-O—CH$_2$-Cyclohexyl | 4-CF$_3$ | 100 (5) | 0.72 |
| 3l | | 3-O—CH$_2$-Pyrrolidine | 4-CF$_3$ | 81 (5) | 2.1 |
| 3m | | 3-O—CH$_2$—Ph-3-OMe | 4-CF$_3$ | 81 (10) | 4.1 |
| 3n | | 3-O—CH$_2$—Ph-3-CF$_3$ | 4-CF$_3$ | 58 (10) | 6.3 |
| 3o | | 3-OH | 3-iPr | 82 (2.5) | 1.7 |
| 3p | | 3-OH | N(CH$_3$)$_2$ | 43 (20) | 7.1 |
| 3q | | 3-OH | 3-OH | 22 (40) | 18.3 |
| 3r | | 3-OH | 4-OMe | 65 (40) | 21.3 |
| 3s | | 3-OH | 4-OH, 3-OMe | 57 (40) | 28.7 |
| 3t | | 4-OH, 3-OMe | 4-OH, 3-OMe | 55 (40) | 29.1 |

[a]% Protection value is the maximal activity a compound possesses, reported as % rescue from Tm (0.15 μg/mL)—induced reduction of cell viability, as measured by intracellular ATP levels; the values for Tm treatment alone and control (DMSO, without Tm) treatment are designated as 0% and 100%, respectively.
[b]EC$_{50}$ values (the concentrations that reach half-maximal activity) for INS-1 cell viability are calculated with GraphPad Prism from the data of ten 2-fold serial titration points in all tables.
All experiments were performed in triplicate.

We further synthesized derivatives in this backbone with substituents in the A-ring while keeping the B-ring the same -3-CF$_3$ as in 3a. 3b with a 4-ethyl moiety showed poorer β-cell protective activity whereas 3c with the H-bonding donor function group (—OH) at A-ring exhibited similar Likewise, 3g with 2, 3-di OH substituents on A-ring and -4-CF$_3$ on B-ring displayed a similarly potent activity (100% maximal protection at 20 μM) as 3f. Yet again, both 3f and 3g achieved the perfect protective activities only at 10 μM or above.

We next wanted to test whether substituting with a single H-bonding donor group (—OH) at A-ring while maintaining-4-CF$_3$ at B-ring has an effect on the resultants' β-cell protective activity. As a result, 3h with -4-OH on A-ring basically maintained the same activity as 3f (100% maximal activity at 10 μM), but 3h had a more favorable EC$_{50}$ (0.27 μM for 3h vs. 2.2 μM for 3f). Surprisingly, 3i with -3-OH on A-ring achieved 100% maximal activity at much lower concentration (1.2 μM) with an EC$_{50}$ 0.19 μM). Apparently, -3-OH is critical for 3i's β-cell protective activity in that substituting the -3-OH on A-ring in 3i with 3-methoxy group (3j) while maintaining -4-CF$_3$ at B-ring drastically reduced its maximal β-cell protection activity from 100% at 1.2 μM for 3i to 71% at 40 μM and caused significant right shift of EC$_{50}$ from 0.19 to 25 μM, indicating that H-bonding donor function is essential for the activity. Compound 3i was thus found to be particularly efficacious.

After establishing —OH group on A-ring for the functional significance of the derivatives, we next asked whether increasing bulkiness or extended hydrogen bonding functional groups on A ring affects the β-cell protective activity. Compound 3k with cyclohexyl on A ring still achieved 100% maximal activity but did so at significantly higher concentration and higher EC$_{50}$ (100% protection at 5 μM; EC$_{50}$=0.72 μM). Compounds 3l with extended hydrogen bonding donor pyrrolidine and 3m with 3-O—CH$_2$-Ph-3-OMe on A-ring exhibited diminished (relative to 3i) but still significant activity on β-cell protection (81% maximal activity at 5 μM; EC$_{50}$=2.1 μM for 3l, and 81% maximal activity at 10 μM; EC$_{50}$=4.1 μM for 3m). In contrast, compound 3n (3-O—CH$_2$-Ph-3-CF3) showed markedly diminished activity. These results suggest that the increased bulkiness in —OH group on A-ring is unfavorable for β-cell protective activity.

We next tested the effect on the β-cell protection when —CF$_3$ group at the B-ring is replaced by other moieties. We replaced the —CF$_3$ group with similarly bulky groups while maintaining -3-OH on A-ring: isopropyl group (iPr) for 3o and N(CH$_3$)$_2$ for 3p. 3o displayed decent activity (82% maximal activity at 2.5 μM; EC$_{50}$=1.7 μM) while 3p was poorer in protecting β-cells (43% maximal activity at 20 μM; EC$_{50}$=7.1 μM), suggesting that these groups are not optimal for their activity. In addition, introduction of H-bonding functional groups to B-ring (3q with 3-OH, 3r with 4-OMe, and 3s with 4-OH, 3-OMe) caused significantly diminishment in activity (22% maximal activity at 40 μM for 3q, 65% maximal activity at 40 μM for 3r, and 57% maximal activity at 40 μM for 3s), indicating that hydrogen bonding functional groups on B-ring are unsuitable for β-cell protection. Also, as expected, 3t with 4-OH, 3-OMe on A-ring combined with 4-OH, 3-OMe on B-ring exhibited equally poor β-cell protective activity.

TABLE 3

Acetamide and Urea analogs and their Biological Evaluation

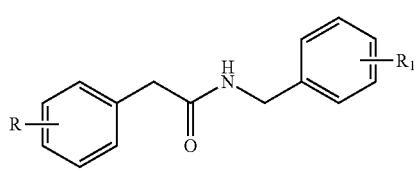

4a

| Comp. No. | Scaffold | R | R$^1$ | Maximum % of Protection at Concentration (μM)$^a$ | EC$_{50}$ (μM)$^b$ |
|---|---|---|---|---|---|
| 4a | Phenylacetamide | 3-OH | 4-CF3 | 36 (20) | 3.5 |
| 5a | Urea | 3-OH | 4-CF$_3$ | 65 (10) | 2.6 |
| 5b |  | 3-OMe | 4-CF3 | 94 (20) | 1.6 |

$^a$% Protection value is the maximal activity a compound possesses, reported as % rescue from Tm (0.15 μg/mL)—induced reduction of cell viability, as measured by intracellular ATP levels; the values for Tm treatment alone and control (DMSO, without Tm) treatment are designated as 0% and 100%, respectively.
$^b$EC$_{50}$ values (the concentrations that reach half-maximal activity) for INS-1 cell viability are calculated with GraphPad Prism from the data of ten 2-fold serial titration points in all tables.
All experiments were performed in triplicate.

We next synthesized compounds with replacements on the amide linker region to investigate whether these changes affect their β-cell protective activity. Insertion of a methyl group extension in amide linker region (4a) significantly diminished the β-cell protective activity (Table 3) (32% maximal activity at 20 μM), indicating that acetic amide is not of a suitable length for β-cell protection. To improve metabolic stability, we replaced the amide in 3i with a urea group and the resultant compound 5a retained some β-cell protective activity (65% maximal activity at 10 μM) but was still significantly weaker than 3i. On the other hand, 5b with a urea group replaced from 3j which carries 3-OMe on A-ring exhibited improved β-cell protective activity (94% maximal activity at 20 μM; EC$_{50}$=1.6 μM for 5b vs. 71% maximal activity at 40 μM; EC$_{50}$=25 μM for 3j).

Compound 3i (also referred to herein as WO3M) was found to be particularly remarkable for its efficacious β-cell protective activity even at sub-micro molar concentrations, and thus was selected for further investigation.

Figure 2:
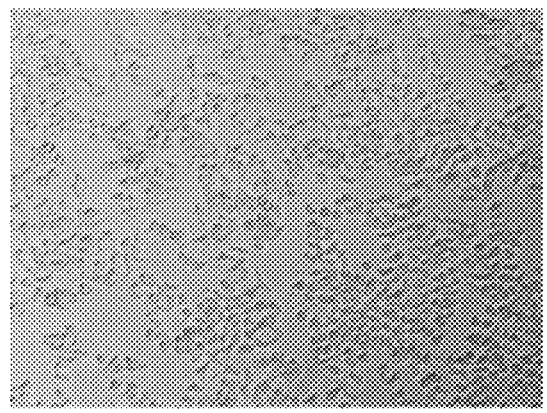
FIG. 2 shows that compound WO3i preserves the INS-1 β cell viability under ER stress. INS-1 cells were treated with or without Tm (0.5 µg/mL) in the presence of WO3i (5 µM) or DMSO (0.1%) for 24 h, and live-cell phase-contrast images were acquired (magnification 10×).
Figure 2:
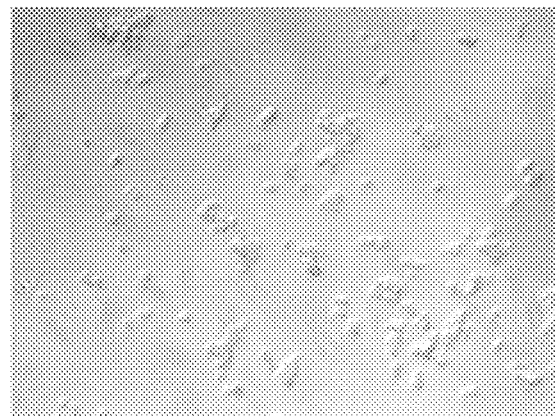
Figure 2:
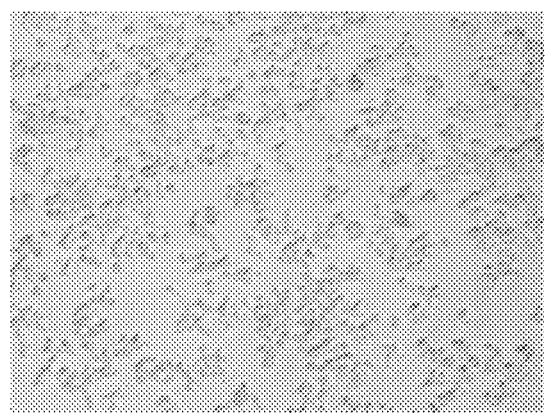

To determine whether the increase in cell viability following treatment with WO3i was caused by a suppression of apoptotic cell death, levels of cleaved caspase-3 and cleaved PARP were assessed by Western blotting. Under normal condition, both caspase 3 and PARP exist in inactive forms. However, upon severe ER stress, caspase 3 undergoes proteolytic cleavage to form the active enzyme, which in turns cleaves PARP, to trigger apoptotic cell death. Hence, induction of the cleaved forms of caspase-3 and PARP is an indication of apoptosis. Tm treatment for 24 h significantly induced protein levels of cleaved caspase-3 and cleaved PARP in INS-1 cells (FIG. 1). However, WO3 co-treatment at two concentrations ((1 and 5 μm) almost completely abolished Tm-induced cleavage of both caspase-3 and PARP (FIG. 1). These results demonstrate that WO3M suppresses Tm-induced apoptosis of INS-1 cells. Consistent with this result, images taken under bright field microscopy showed that significantly more cells were preserved with Tm and WO3M co-treatment than with Tm alone (FIG. 2).

Having established that compound WO3M protects β-cells against ER stress-induced cell death, we next investigated the mechanism of action of WO3 on ER stress. First we investigated whether WO3M suppresses CHOP expression and whether WO3i affects any UPR pathways. We first determined whether WO3M has any effect on CHOP expression in INS-1 cells treated with Tm. Tm treatment of INS-1 cells significantly increased the mRNA levels of CHOP at 4 and 8 hours, compared to DMSO treatment (FIG. 3). Co-treatment with WO3i markedly diminished the Tm-induced increase in CHOP mRNA levels at both time points (FIG. 3). These results showed that WO3i suppressed Tm-induced CHOP up-regulation.

We next investigated whether WO3i affects each of three UPR pathways under ER stress. We first determined the effect of WO3i on ATF6 in β-cells under ER stress. ER stress activates ATF6 which acts as a homodimer or as an ATF6-XBP1s heterodimer to control the up-regulation of select UPR target genes including the chaperone protein BiP. We assessed the effect of WO3i on the mRNA level of Bip in β cells treated with Tm. We found that Bip mRNA levels were up-regulated in INS-1 cells treated with Tm at 4 h and 8 h (FIG. 4). These increases were completely suppressed by WO3i co-treatment (FIG. 4).

We next investigated the effect of WO3i on IRE1α activation. Activation of the IRE1α leads to cleavage of X-box binding protein-1 (XBP1) mRNA, resulting in a spliced form of XBP1 RNA (XBP1-s) that controls the expression of UPR genes involved in ER protein folding and degradation once translated to protein. We therefore used XBP1-s RNA levels as a marker for the activation of the IRE1α pathway and determined the effect of WO3i on IRE 1α-mediated XBP1 splicing in INS-1 cells. As shown in FIG. 5, Tm increased the level of XBP1-s mRNA in INS-1 cells, but this increase was eliminated by WO3i co-treatment, as measured by qRT-PCT using XBP1 splicing-specific primers. These results indicate that WO3i inhibits Tm-induced activation of IRE1α-XBP1 pathway.

We finally determined the effect of WO3i on the activation of the PERK pathway in β-cells under ER stress. PERK activation leads to the increase in the transcription and translation of activating transcription factor 4 (ATF4) and CHOP. We used ATF4 expression level as a marker of PERK pathway activation. Tm treatment of INS-1 cells significantly increased ATF mRNA level at 4 and 8 h, whereas co-treatment with WO3i abolished the Tm-induced ATP mRNA increase (FIG. 6). Together, these results indicate that WO3i inhibits the ER stress-induced activation of all three UPR pathway.

The present disclosure describes a series of hydroxybenzamide derivatives capable of protecting pancreatic β cells from ER stress-induced death. The compound 3-hydroxy-N-(4-(trifluoromethyl)benzyl)benzamide (WO3i) particularly demonstrated a strong ability to protect β cells (100% protection; $EC_{50}=0.19$) from ER-stress-induced death. In addition, we showed that WO3i suppresses ER stress-induced pro-apoptotic CHOP activation and apoptotic genes caspase-3 and PARP. Mechanistically, we found that WO3i inhibits ER stress-induced up-regulation of all three branches of unfolded protein response. The series of hydroxybenzamide derivatives described herein, particularly compound WO3i, can be used in the treatment of diabetes, as well as a new tool for studying ER-stress induced cell death modulation in β cells.

Characterization of hydroxybenzamide derivatives synthesized herein:

3-(5-(4-(Trifluoromethyl)phenyl)-1H-imidazol-2-yl)benzene-1,2-diol (1a)

Compound 1a was prepared by following above general procedure: brown powder, 28% Yield; mp=196-198° C.; $^1$H NMR (DMSO-d$_6$, 400 MHz) δ: 13.09 (s, 1H), 12.72 (s, 1H), 9.04 (s, 1H), 8.04 (m, 3H), 7.79 (d, J=7.8, 2 Hz), 7.35 (d, J=6.8, 1 Hz), 6.81 (m, 2H). $^{13}$C NMR (100 MHz, DMSO-d$_6$) δ: 147.1, 145.6, 143.9, 139.8, 136.5, 131.5, 126.0, 125.8, 124.5, 124.2, 123.3, 120.0, 118.2; HRMS (ESI) m/z: calculated for $C_{16}H_{11}F_3N_2O_2$ [M$^+$H]$^+$ 320.0773, found 320.0768.

2-Methoxy-4-(5-(4-(trifluoromethyl)phenyl)-1H-imidazol-2-yl)phenol (1b)

Compound 1b was prepared by following above general procedure: brown powder, 33% Yield; mp=119-121° C.; $^1$H NMR (DMSO-d$_6$, 400 MHz) δ: 9.45 (s, 1H), 8.31 (s, 1H), 8.04 (d, J=8.0 Hz, 2H), 7.66 (m, 3H), 7.53 (d, J=8.0 Hz, 1H). 7.29 (s, 1H), 7.51 (s, 1H), 3.85 (s, 3H). $^{13}$C NMR (126 MHz, DMSO-D$_6$) δ 148.27, 147.70, 125.97, 125.06, 122.43, 118.67, 116.15, 109.74, 56.17, 40.50, 40.33, 40.26, 40.17, 40.00, 39.83, 39.66, 39.50, 37.80, 21.59; HRMS (ESI) m/z: calculated for $C_{17}H_{13}F_3N_2O_2$[M$^+$H]$^+$ 335.2982, found 336.2985.

2-(4-Methoxyphenyl)-5-(4-(trifluoromethyl)phenyl)-1H-imidazole (1c)

Compound 1c was prepared by following above general procedure: off-white powder, 52% Yield; mp=182-185° C.; $^1$H NMR (DMSO-d$_6$, 400 MHz) δ: 12.65 (s, 1H), 8.05 (d, J=8.0, 2 Hz), 7.96 (s, 1H), 7.92 (d, J=3.6, 2 Hz), 7.71 (d, J=8.0, 2 Hz), 7.05 (d, J=8.4, 2 Hz), 3.81 (s, 3H). $^{13}$C NMR (126 MHz, DMSO-D$_6$) δ 160.03, 127.09, 126.19, 125.96, 125.09, 123.63, 114.71, 55.74, 40.51, 40.34, 40.18, 40.01, 39.84, 39.68, 39.51; HRMS (ESI) m/z: calculated for $C_{17}H_{13}F_3N_2O$ [M$^+$H]$^+$ 319.2992, found 320.2990.

N-(4-methoxybenzyl)-5-(4-(trifluoromethyl)phenyl)-1H-imidazol-2-amine (2a)

Compound 2a was prepared in multistep synthesis by following above reported procedure: white powder, 59% Yield; mp=156-158° C.; $^1$H NMR (DMSO-d$_6$, 500 MHz) δ: 10.63 (s, 1H), 7.77 (s, 2H), 7.56 (d, J=8.5 Hz, 2H), 7.27 (d, J=8.0 Hz, 2H), 7.22 (s, 1H), 6.83 (d, J=8.2 Hz, 2H), 6.29 (t, J=6.0 Hz, 1H), 4.27 (d, J=6.0 Hz, 2H), 3.67 (s, 3H). $^{13}$C NMR (DMSO-d$_6$, 100 MHz) δ: 158.65, 133.05, 129.24, 126.20, 125.71, 124.30, 124.14, 114.06, 55.53, 46.34. HRMS (ESI) m/z: calculated for $C_{18}H_{16}F_3N_3O$ [M$^+$H]$^+$ 347.1243, found 347.1233.

N-(4-methoxybenzyl)-5-(2-methoxyphenyl)-1H-imidazol-2-amine (2b)

Compound 2b was prepared in multistep synthesis by following above reported procedure: white powder, 66% Yield; mp=165-169° C.; $^1$H NMR (DMSO-d$_6$, 500 MHz) δ: 10.42 (s, 1H), 7.51 (m, 2H), 7.43 (d, J=8.1 Hz, 2H), 7.27 (d, J=8.0 Hz, 2H), 7.22 (s, 1H), 6.83 (d, J=8.2 Hz, 2H), 6.29 (t, J=6.0 Hz, 1H), 4.27 (d, J=6.0 Hz, 2H), 3.67 (s, 6H). $^{13}$C NMR (DMSO-d$_6$, 100 MHz) δ: 157.61, 131.23, 129.20, 126.23, 125.71, 124.30, 124.14, 114.06, 53.53, 46.34. HRMS (ESI) m/z: calculated for $C_{18}H_{19}N_3O_2$ [M$^+$H]$^+$ 309.1477, found 309.1473.

3-Chloro-2-methyl-N-(3-(trifluoromethyl)benzyl)benzamide (3a)

Compound 3a was prepared by following above general procedure: white powder, 92% yield; mp=88-91° C.; $^1$H NMR (CDCl$_3$, 400 MHz) δ: 7.57 (m, 3H), 7.50 (d, J=7.5 Hz, 1H), 7.41 (d, J=7.9 Hz, 1H), 7.23 (s, 1H), 7.14 (m, 1H), 6.16 (s, 1H), 4.68 (d, J=6.0 Hz, 2H), 2.44 (s, 3H). $^{13}$C NMR (100 MHz, CDCl$_3$) δ: 169.4, 139.0, 138.2, 135.9, 134.0, 131.1, 130.8, 129.5, 126.8, 124.9, 124.6, 124.5, 43.5, 16.9. HRMS (ESI) m/z: calculated for C$_{16}$H$_{13}$ClF$_3$NO [M$^+$H]$^+$ 327.0608, found 327.0602.

4-Ethyl-N-(3-(trifluoromethyl)benzyl)benzamide (3b)

Compound 3b was prepared by following above general procedure: white powder, 90% yield; mp=119-121° C.; $^1$H NMR (CDCl$_3$, 400 MHz) δ: 7.93 (d, J=7.9 Hz, 2H), 7.56 (m, 3H), 7.46 (m, 1H), 7.26 (d, J=6.5 Hz, 2H), 6.52 (s, 1H), 4.70 (d, J=5.8 Hz, 2H), 2.69 (q, J=7.5 Hz, 2H), 1.24 (t, J=7.5 Hz, 3H). $^{13}$C NMR (100 MHz, CDCl$_3$) δ: 167.4, 148.5, 139.4, 131.3, 131.2, 130.8, 129.2, 128.1, 127.5, 124.4, 43.5, 28.8, 15.3. HRMS (ESI) m/z: calculated for C$_{17}$H$_{16}$F$_3$NO [M$^+$H]$^+$ 307.1184, found 307.1179.

3-Hydroxy-N-(3-(trifluoromethyl)benzyl)benzamide (3c)

Compound 3c was prepared by following above general procedure: white powder, 88% yield; mp=155-157° C.; $^1$H NMR (DMSO-d$_6$, 400 MHz) δ: 9.67 (s, 1H), 9.04 (t, J=5.7 Hz, 1H), 7.60 (m, 4H), 7.29 (m, 3H), 6.92 (d, J=7.5 Hz, 1H), 4.53 (d, J=5.8 Hz, 2H); $^{13}$C NMR (100 MHz, DMSO-d$_6$) δ: 166.8, 157.8, 141.7, 136.7, 136.0, 131.8, 129.8, 129.6, 124.1, 123.9, 118.7, 118.1, 114.7, 42.6; HRMS (ESI) m/z: calculated for C$_{15}$H$_{12}$F$_3$NO$_2$ [M$^+$H]$^+$ 295.0820, found 296.0834.

3,4-Dihydroxy-N-(3-(trifluoromethyl)benzyl)benzamide (3d)

Compound 3d was prepared by following above general procedure: light brown powder, 30% yield; mp=188-190° C.; $^1$H NMR (DMSO-d$_6$, 400 MHz) δ: 9.60 (s, 1H), 8.92 (t, J=5.7 Hz, 1H), 7.59 (m, 4H), 7.46 (s, 1H), 7.40 (d, J=8.3 Hz, 1H), 6.82 (d, J=8.1 Hz, 1H), 4.53 (d, J=5.7 Hz, 2H), 3.81 (s, 3H). $^{13}$C NMR (100 MHz, DMSO-d$_6$) δ: 166.4, 150.1, 147.6, 131.8, 129.8, 125.4, 124.1, 123.9, 121.2, 115.3, 111.7, 56.0, 42.6; HRMS (ESI) m/z: calculated for C$_{15}$H$_{12}$F$_3$NO$_3$ [M$^+$H]$^+$ 311.0769, found 312.0777.

4-Hydroxy-3-methoxy-N-(3-(trifluoromethyl)benzyl)benzamide (3e)

Compound 3e was prepared by following above general procedure: white powder, 78% yield; mp=122-124° C.; $^1$H NMR (DMSO-d$_6$, 400 MHz) δ: 9.58 (s, 1H), 8.91 (t, J=5.5 Hz, 1H), 7.69 (d, J=8.0 Hz, 2H), 7.53 (s, 1H), 7.49 (d, J=8.1 Hz, 2H), 7.41 (d, J=8.4 Hz, 1H), 6.82 (d, J=8.1 Hz, 1H), 4.53 (d, J=5.6 Hz, 2H), 3.81 (s, 3H). $^{13}$C NMR (100 MHz, DMSO-d$_6$) δ: 168.9, 158.3, 151.3, 138.9, 132.4, 130.2, 128.9, 125.4, 124.3, 123.1, 121.1, 118.0, 115.3, 56.5, 44.3. HRMS (ESI) m/z: calculated for C$_{16}$H$_{14}$F$_3$NO$_3$[M$^+$H]$^+$ 325.0926, found 325.0921.

3,4-Dihydroxy-N-(4-(trifluoromethyl)benzyl)benzamide (3f)

Compound 3f was prepared by following above general procedure: light brown powder, 52% yield; mp=166-168° C.; $^1$H NMR (DMSO-d$_6$, 400 MHz) δ: 8.81 (t, J=5.4 Hz, 1H), 7.68 (d, J=7.8 Hz, 2H), 7.49 (d, J=7.7 Hz, 2H), 7.31 (s, 1H), 7.24 (d, J=8.4 Hz, 1H), 6.76 (d, J=8.1 Hz, 1H), 4.49 (d, J=5.2 Hz, 2H). $^{13}$C NMR (100 MHz, DMSO-d$_6$) δ: 166.4, 150.1, 147.6, 131.8, 129.8, 125.4, 124.1, 123.9, 121.2, 115.3, 111.7, 56.0, 42.6; HRMS (ESI) m/z: calculated for C$_{15}$H$_{12}$F$_3$NO$_3$[M$^+$H]$^+$ 311.0769, found 312.0771.

2,3-Dihydroxy-N-(4-(trifluoromethyl)benzyl)benzamide (3g)

Compound 3g was prepared by following above general procedure: light brown powder, 47% yield; mp=155-157° C.; $^1$H NMR (DMSO-d$_6$, 400 MHz) δ: 9.49 (s, 1H), 9.13 (s, 1H), 8.81 (t, J=5.6 Hz, 1H), 7.68 (d, J=7.9 Hz, 2H), 7.49 (d, J=7.9 Hz, 2H), 7.32 (s, 1H), 7.24 (d, J=8.3 Hz, 1H), 6.77 (d, J=8.1 Hz, 1H), 4.49 (d, J=5.6 Hz, 2H). $^{13}$C NMR (100 MHz, DMSO-d$_6$) δ: 168.4, 153.1, 147.6, 131.8, 129.8, 125.4, 124.1, 123.9, 121.2, 115.3, 111.7, 56.0, 42.6. HRMS (ESI) m/z: calculated for C$_{15}$H$_{12}$F$_3$NO$_3$[M$^+$H]$^+$ 311.0769, found 311.0767.

4-Hydroxy-N-(4-(trifluoromethyl)benzyl)benzamide (3h)

Compound 3h was prepared by following above general procedure: white powder, 66% yield; mp=166-169° C.; $^1$H NMR (DMSO-d$_6$, 400 MHz) δ: 10.0 (s, 1H), 8.89 (t, J=5.6 Hz, 1H), 7.77 (d, J=8.2 Hz, 2H), 7.68 (d, J=7.9 Hz, 2H), 7.51 (d, J=7.9 Hz, 2H), 6.81 (d, J=8.1 Hz, 2H) 4.53 (d, J=5.8 Hz, 2H); $^{13}$C NMR (100 MHz, DMSO-d$_6$) δ: 169.8, 163.6, 143.2, 130.7, 129.9, 131.8, 129.8, 129.6, 124.1, 123.9, 118.7, 118.1; HRMS (ESI) m/z: calculated for C$_{15}$H$_{12}$F$_3$NO$_2$[M$^+$H]$^+$ 295.0820, found 296.0824.

3-Hydroxy-N-(4-(trifluoromethyl)benzyl)benzamide (3i)

Compound 3i was prepared by following above general method, white powder, 68% yield; mp=163-166° C.; HPLC purity=97.2%; $^1$H NMR (DMSO-d$_6$, 400 MHz) δ: 9.66 (s, 1H), 9.04 (t, J=5.5 Hz, 1H), 7.69 (d, J=7.8 Hz, 2H), 7.51 (d, J=7.9 Hz, 2H), 7.27 (m, 3H), 6.92 (d, J=7.9 Hz, 1H), 4.52 (d, J=5.8 Hz, 2H). $^{13}$C NMR (100 MHz, DMSO-d$_6$) δ: 167.9, 157.8, 141.7, 136.7, 136.0, 131.8, 129.8, 129.3, 124.1, 123.9, 118.7, 118.1, 114.7, 42.6; HRMS (ESI) m/z: calculated for C$_{15}$H$_{12}$F$_3$NO$_2$[M$^+$H]$^+$ 295.0820, found 296.0821.

3-Methoxy-N-(4-(trifluoromethyl)benzyl)benzamide (3j)

Compound 3j was prepared by following above general procedure: white powder, 63% yield; mp=93-95° C.; $^1$H NMR (DMSO-d$_6$, 400 MHz) δ: 9.04 (t, J=5.7 Hz, 1H), 7.60 (m, 4H), 7.29 (m, 3H), 6.92 (d, J=7.5 Hz, 1H), 4.53 (d, J=5.8 Hz, 2H), 3.85 (s, 3H); $^{13}$C NMR (100 MHz, DMSO-d$_6$) δ: 166.8, 157.8, 141.7, 136.7, 136.0, 131.8, 129.8, 129.6, 124.1, 123.9, 118.7, 118.1, 114.7, 42.6; HRMS (ESI) m/z: calculated for C$_{16}$H$_{14}$F$_3$NO$_2$ [M$^+$H]$^+$ 309.0977, found 312.0981.

3-(Cyclohexylmethoxy)-N-(4-(trifluoromethyl)benzyl)benzamide (3k)

Compound 3k was prepared by following above general procedure: white powder, 92% yield. mp=95-97° C.; $^1$H NMR (DMSO-d$_6$, 500 MHz) δ: 9.04 (t, J=5.7 Hz, 1H), 7.65 (d, J=3.8 Hz, 2H), 7.48 (d, J=3.8 Hz, 2H), 7.42 (d, J=10 Hz, 1H), 7.39 (s, 1H), 7.33 (t, J=5.7 Hz, 1H), 7.05 (dd, J=5.0 Hz, 1H), 4.51 (d, J=5.0 Hz, 2H), 3.78 (d, J=5.0 Hz, 2H), 1.68 (m, 6H), 1.11 (m, 5H); $^{13}$C NMR (100 MHz, DMSO-$d_6$) δ: 166.61, 159.32, 135.91, 130.07, 128.40, 125.75, 125.72, 119.94, 118.21, 113.43, 73.39, 42.85, 37.64, 29.78, 26.56, 25.79. HRMS (ESI) m/z: calculated for $C_{22}H_{24}F_3NO_2$ [M$^+$H]$^+$ 391.1759, found 391.1755.

3-(Piperidin-4-ylmethoxy)-N-(4-(trifluoromethyl)benzyl)benzamide (3l)

Compound 3l was prepared by following above general procedure: off-white powder, 30% yield; mp=66-69° C.; $^1$H NMR (DMSO-$d_6$, 400 MHz) δ: 9.18 (t, J=5.7 Hz, 1H), 8.82 (s, 1H), 7.75 (d, J=7.9 Hz, 2H), 7.58 (d, J=8.2 Hz, 2H), 7.48 (m, 3H), 7.23 (m, 1H), 4.60 (d, J=5.6 Hz, 2H), 4.04 (m, 2H), 3.93 (d, J=6.2 Hz, 2H), 2.79, (s, 2H), 1.98 (m, 1H), 1.81 (m, 2H), 1.16 (m, 4H). $^{13}$C NMR (100 MHz, DMSO-$d_6$) δ: 169.7, 165.7, 138.7, 136.6, 129.5, 128.5, 127.5, 126.5, 120.3, 119.1, 117.8, 76.5, 48.2, 44.3. HRMS (ESI) m/z: calculated for $C_{21}H_{23}F_3N_2O_2$ [M$^+$H]$^+$ 392.1712, found 392.1708.

3-((3-Methoxybenzyl)oxy)-N-(4-(trifluoromethyl)benzyl)benzamide (3m)

Compound 3m was prepared by following above general procedure: white powder, 77% yield; mp=190-191° C.; $^1$H NMR (DMSO-$d_6$, 400 MHz) δ: 7.53 (m, 3H), 7.43 (m, 2H), 7.28 (m, 2H), 7.22 (m, 1H), 7.08 (m, 1H), 6.84 (m, 1H), 6.46 (bs, 1H), 5.04 (s, 2H), 4.65 (d, J=6.0 Hz, 2H), 3.77 (s, 3H); $^{13}$C NMR (100 MHz, DMSO-$d_6$) δ: 167.2, 159.8, 159.0, 139.2, 138.0, 135.5, 131.2, 129.7, 129.3, 124.5, 119.6, 119.0, 118.6, 113.6, 113.5, 112.9, 70.0, 55.2, 43.6; HRMS (ESI) m/z: calculated for $C_{23}H_{20}F_3NO_2$ [M$^+$H]$^+$ 415.1395, found 416.1397.

N-(4-(Trifluoromethyl)benzyl)-3-((3-(trifluoromethyl)benzyl)oxy)benzamide (3n)

Compound 3n was prepared by following above general procedure: white powder, 69% yield; mp=119-122° C.; $^1$H NMR (DMSO-$d_6$, 400 MHz) δ: 9.15 (t, J=5.8 Hz, 1H), 7.83 (s, 1H), 7.78 (d, J=7.4 Hz, 1H), 7.71 (d, J=7.6 Hz, 1H), 7.61 (m, 6H), 7.51 (d, J=7.8 Hz, 1H), 7.42 (t, J=7.8 Hz, 1H), 7.22 (d, J=7.9 Hz, 1H), 5.27 (s, 2H), 4.56 (d, J=5.8 Hz, 2H); $^{13}$C NMR (100 MHz, DMSO-$d_6$) δ: 166.4, 158.5, 141.6, 138.8, 135.9, 132.1, 131.9, 130.1, 130.0, 129.8, 125.1, 124.5, 124.0, 120.4, 118.3, 114.0, 68.9, 42.7; HRMS (ESI) m/z: calculated for $C_{23}H_{17}F_6NO_2$ [M$^+$H]$^+$ 453.1163, found 454.1165.

3-Hydroxy-N-(4-isopropylbenzyl)benzamide (3o)

Compound 3o was prepared by following above general procedure: white powder, 55% yield; mp=144-148° C.; $^1$H NMR (DMSO-$d_6$, 400 MHz) δ: 9.63 (s, 1H), 8.89 (t, J=5.7 Hz, 1H), 7.23 (m, 7H), 6.90 (d, J=7.6 Hz, 1H), 4.39 (d, J=5.8 Hz, 2H), 2.87 (m, 1H), 1.17 (d, J=6.8 Hz, 6H); $^{13}$C NMR (100 MHz, DMSO-$d_6$) δ: 166.6, 157.7, 147.7, 137.6, 136.3, 129.7, 127.7, 126.6, 118.5, 118.1, 114.7, 99.9, 42.7, 33.5, 24.4; HRMS (ESI) m/z: calculated for $C_{17}H_{19}NO_2$ [M$^+$H]$^+$ 269.1416, found 270.1418.

N-(4-(Dimethylamino)benzyl)-3-hydroxybenzamide (3p)

Compound 3p was prepared by following above general procedure: brown powder, 23% yield; mp=177-179° C.; $^1$H NMR (DMSO-$d_6$, 400 MHz) δ: 9.66 (s, 1H), 9.04 (t, J=5.5 Hz, 1H), 7.69 (d, J=7.8 Hz, 2H), 7.51 (d, J=7.9 Hz, 2H), 7.27 (m, 3H), 6.92 (d, J=7.9 Hz, 1H), 4.52 (d, J=5.8 Hz, 2H), 3.02 (s, 6H). $^{13}$C NMR (100 MHz, DMSO-$d_6$) δ: 168.9, 159.6, 151.2, 136.9, 132.2, 128.9, 127.5, 122.3, 120.3, 117.5, 115.7, 44.3, 42.1; HRMS (ESI) m/z: calculated for $C_{16}H_{18}N_2O_2$ [M$^+$H]$^+$ 270.1368, found 271.1371.

3-Hydroxy-N-(3-hydroxybenzyl)benzamide (3q)

Compound 3q was prepared by following above general procedure: brown powder, 32% yield; mp=166-169° C.; $^1$H NMR (DMSO-$d_6$, 400 MHz) δ: 9.50 (s, 1H), 8.50 (s, 1H), 8.81 (t, J=5.6 Hz, 1H), 7.68 (d, J=7.9 Hz, 2H), 7.49 (d, J=7.9 Hz, 2H), 7.32 (s, 1H), 7.24 (d, J=8.3 Hz, 1H), 6.77 (d, J=8.1 Hz, 1H), 4.49 (d, J=5.6 Hz, 2H). $^{13}$C NMR (100 MHz, DMSO-$d_6$) δ: 168.9, 160.9, 158.6, 142.3, 140.7, 132.2, 131.9, 125.6, 120.3, 117.2, 115.2, 114.3, 44.3; HRMS (ESI) m/z: calculated for $C_{14}H_{13}NO_3$ [M$^+$H]$^+$ 243.0895, found 244.0895.

3-Hydroxy-N-(4-methoxybenzyl)benzamide (3r)

Compound 3r was prepared by following above general procedure: brown powder, 62% yield; mp=163-166° C.; $^1$H NMR (DMSO-$d_6$, 400 MHz) δ: 9.63 (s, 1H), 8.87 (t, J=5.7 Hz, 1H), 7.24 (m, 5H), 6.89 (m, 3H), 4.36 (d, J=5.9 Hz, 2H), 3.72 (s, 3H). $^{13}$C NMR (100 MHz, DMSO-$d_6$) δ: 168.9, 158.9, 142.3, 140.7, 132.2, 131.9, 125.6, 120.3, 117.2, 115.2, 114.3, 55.2, 44.3; HRMS (ESI) m/z: calculated for $C_{15}H_{15}NO_3$[M$^+$H]$^+$ 257.1052, found 257.1055.

3-Hydroxy-N-(4-hydroxy-3-methoxybenzyl)benzamide (3s)

Compound 3s was prepared by following above general procedure: off-white powder, 44% yield; mp=174-177° C.; $^1$H NMR (DMSO-$d_6$, 400 MHz) δ: 9.58 (s, 1H), 9.13 (t, J=5.5 Hz, 1H), 7.69 (d, J=8.0 Hz, 2H), 7.53 (s, 1H), 7.49 (d, J=8.1 Hz, 2H), 7.41 (d, J=8.4 Hz, 1H), 6.82 (d, J=8.1 Hz, 1H), 4.53 (d, J=5.6 Hz, 2H), 3.81 (s, 3H). $^{13}$C NMR (100 MHz, DMSO-$d_6$) δ: 168.9, 158.4, 148.4, 147.5, 138.6, 132.5, 131.2, 123.4, 121.2, 119.3, 117.2, 110.3, 56.2, 44.3; HRMS (ESI) m/z: calculated for $C_{15}H_{15}NO_4$ [M$^+$H]$^+$ 273.1001, found 273.1004.

4-Hydroxy-N-(4-hydroxy-3-methoxybenzyl)-3-methoxybenzamide (3t)

Compound 3t was prepared by following above general procedure: off-white powder, 59% yield; mp=61-65° C.; $^1$H NMR (DMSO-$d_6$, 400 MHz) δ: 9.53 (s, 1H), 8.82 (s, 1H), 8.68 (t, J=5.7 Hz, 1H), 7.46 (s, 1H), 7.38 (d, J=8.2 Hz, 1H), 6.88 (s, 1H), 6.80 (d, J=8.1 Hz, 1H), 6.70 (s, 2H), 4.34 (d, J=5.7 Hz, 2H) 3.80 (s, 3H), 3.75 (s, 3H); $^{13}$C NMR (100 MHz, DMSO-$d_6$) δ: 166.1, 149.8, 147.8, 147.5, 145.8, 131.2, 125.9, 121.2, 120.2, 115.6, 115.2, 112.3, 111.7, 56.0, 42.8; HRMS (ESI) m/z: calculated for $C_{16}H_{17}NO_5$ [M$^+$H]$^+$ 303.1107, found 304.1109.

2-(3-Hydroxyphenyl)-N-(4-(trifluoromethyl)benzyl)acetamide (4a)

Compound 4a was prepared by following above (3 series) general procedure: white powder, 45% yield; mp=114-116° C.; $^1$H NMR (DMSO-$d_6$, 400 MHz) δ: 9.30 (s, 1H), 8.59 (d, J=5.7 Hz, 1H), 7.66 (d, J=8.0 Hz, 2H), 7.43 (d, J=8.0 Hz, 2H), 7.08 (t, J=7.7 Hz, 1H), 6.70 (s, 2H), 6.62 (d, J=7.5 Hz, 1H), 4.34 (d, J=5.8 Hz, 2H), 3.39 (s, 2H). $^{13}$C NMR (100 MHz, DMSO-d$_6$) δ: 172.3, 158.5, 141.3, 139.6, 131.2, 129.1, 128.5, 125.3, 124.3, 123.2, 117.3, 115.3, 43.8; HRMS (ESI) m/z: calculated for C$_{16}$H$_{14}$F$_3$NO$_2$[M$^+$H]$^+$ 309.0977, found 310.0979.

Urea Analogs:

To a cold solution of substituted anilines (1 equivalents) dissolved in THF was added excess TEA (5 equivalents) and followed by triphosgene solution (in THF) (0.55 equivalents) and stirred for 5 min. Substituted amines were dissolved in THF and added dropwise to the reaction mixture and continued stirring for 2-3 h at RT. Evaporated solvent then purified by column using Ethylacetate/Hexanes as eluents.

1-(3-Hydroxyphenyl)-3-(4-(trifluoromethyl)benzyl) urea (5a)

Compound 5a was prepared by following above general procedure: white powder, 45% yield; mp=163-165° C.; $^1$H NMR (DMSO-d$_6$, 400 MHz) δ: 9.20 (s, 1H), 8.52 (s, 1H), 7.69 (d, J=8.1 Hz, 2H), 7.50 (d, J=8.0 Hz, 2H), 6.98 (d, J=3.9 Hz, 2H), 6.73 (d, J=8.1 Hz, 1H), 6.65 (t, J=5.9 Hz, 1H), 6.29 (d, J=6.5 Hz, 1H), 4.37 (d, J=5.7 Hz, 2H). $^{13}$C NMR (100 MHz, DMSO-d$_6$) δ: 159.6, 154.5, 142.3, 139.2, 131.2, 129.9, 128.9, 124.5, 114.5, 112.1, 44.3; HRMS (ESI) m/z: calculated for C$_{15}$H$_{13}$F$_3$N$_2$O$_2$ [M$^+$H]$^+$ 310.0929, found 311.0930.

1-(3-Methoxyphenyl)-3-(4-(trifluoromethyl)benzyl) urea (5b)

Compound 5b was prepared by following above general procedure: white powder, 45% yield; mp=138-140° C.; $^1$H NMR (DMSO-d$_6$, 400 MHz) δ: 10.0 (s, 1H), 8.52 (s, 1H), 7.77 (d, J=8.2 Hz, 2H), 7.68 (d, J=7.9 Hz, 2H), 7.51 (d, J=3.9 Hz, 2H), 6.73 (d, J=8.1 Hz, 1H), 6.65 (t, J=5.9 Hz, 1H), 6.29 (d, J=6.5 Hz, 1H), 4.37 (d, J=5.7 Hz, 2H). $^{13}$C NMR (100 MHz, DMSO-d$_6$) δ: 160.4, 155.1, 144.1, 138.2, 129.5, 129.4, 128.6, 125.5, 116.3, 114.2, 55.5, 44.3; HRMS (ESI) m/z: calculated for C$_{16}$H$_{15}$F$_3$N$_2$O$_2$[M$^+$H]$^+$ 324.1086, found 325.1088.

The invention claimed is:

1. A method of treating a disorder or condition associated with endoplasmic reticulum (ER) stress in a subject in need of such therapy, comprising administering to the subject a hydroxybenzamide derivative compound having chemical structure I:

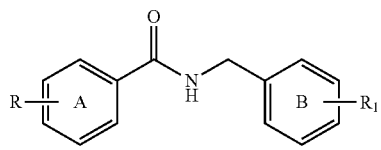

wherein,
R is selected from 3-OH, 2-OH, 4-OH, 5-OH, 2,3-diOH, 2,4-diOH, 2,5-diOH, 3,4-diOH, 3,5-diOH, and 4,5-diOH; and
$R_1$ is selected from 4-trihaloalkyl, 2-monohaloalkyl, 3-monohaloalkyl, 4-monohaloalkyl, 5-monohaloalkyl, 2-dihaloalkyl, 3-dihaloalkyl, 4-dihaloalkyl, 5-dihaloalkyl, 2-trihaloalkyl, 3-trihaloalkyl, and 5-trihaloalkyl, wherein alkyl=C1-C12, and halo is selected from chlorine (Cl), fluorine (F), bromine (Br), and iodine (I).

2. The method of claim 1, wherein the disorder or condition associated with ER stress is type 1 diabetes or type 2 diabetes.

3. A method of protecting pancreatic β-cells in vitro or in vivo from ER stress-induced dysfunction and/or death, comprising administering to the pancreatic β-cells a hydroxybenzamide derivative compound having chemical structure I:

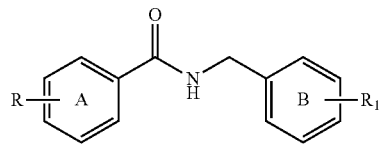

wherein,
R is selected from 3-OH, 2-OH, 4-OH, 5-OH, 2,3-diOH, 2,4-diOH, 2,5-diOH, 3,4-diOH, 3,5-diOH, and 4,5-diOH; and
$R_1$ is selected from 4-trihaloalkyl, 2-monohaloalkyl, 3-monohaloalkyl, 4-monohaloalkyl, 5-monohaloalkyl, 2-dihaloalkyl, 3-dihaloalkyl, 4-dihaloalkyl, 5-dihaloalkyl, 2-trihaloalkyl, 3-trihaloalkyl, and 5-trihaloalkyl, wherein alkyl=C1-C12, and halo is selected from chlorine (Cl), fluorine (F), bromine (Br), and iodine (I).

4. The method of claim 3, wherein the hydroxybenzamide derivative compound is 3-hydroxy-N-(4-(trifluoromethyl)benzyl)benzamide.

* * * * *